(12) United States Patent
Masuzaki et al.

(10) Patent No.: US 11,782,395 B2
(45) Date of Patent: Oct. 10, 2023

(54) DIAGNOSTIC DEVICE, DIAGNOSTIC METHOD AND PROGRAM

(71) Applicant: Mitsubishi Electric Corporation, Tokyo (JP)

(72) Inventors: Takahiko Masuzaki, Tokyo (JP); Osamu Nasu, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 523 days.

(21) Appl. No.: 17/251,209

(22) PCT Filed: Jun. 18, 2018

(86) PCT No.: PCT/JP2018/023102
§ 371 (c)(1),
(2) Date: Dec. 11, 2020

(87) PCT Pub. No.: WO2019/244203
PCT Pub. Date: Dec. 26, 2019

(65) Prior Publication Data
US 2021/0263483 A1    Aug. 26, 2021

(51) Int. Cl.
*G05B 13/02* (2006.01)
*G06N 20/00* (2019.01)
(Continued)

(52) U.S. Cl.
CPC ....... *G05B 13/0265* (2013.01); *G01M 99/005* (2013.01); *G06N 20/00* (2019.01);
(Continued)

(58) Field of Classification Search
CPC .......... G05B 13/0265; G05B 23/0237; G01M 99/005; G06N 20/00; G06Q 10/06395; G06Q 50/04; G07C 3/005
See application file for complete search history.

(56) References Cited

U.S. PATENT DOCUMENTS

| | | | | |
|---|---|---|---|---|
| 6,105,149 A | * | 8/2000 | Bonissone | .......... G06F 11/2257 706/62 |
| 6,587,812 B1 | * | 7/2003 | Takayama | ............... B30B 15/16 702/182 |

(Continued)

FOREIGN PATENT DOCUMENTS

| CN | 101634605 B | 3/2011 |
|---|---|---|
| CN | 105224872 B | 4/2018 |

(Continued)

OTHER PUBLICATIONS

International Search Report and Written Opinion dated Aug. 28, 2018, received for PCT Application No. PCT/JP2018/023102, Filed on Jun. 18, 2018, 8 pages including English Translation.

(Continued)

*Primary Examiner* — Ramesh B Patel
(74) *Attorney, Agent, or Firm* — XSENSUS LLP

(57) ABSTRACT

A diagnostic device (10) includes an acquirer (101) and a diagnoser (140). The acquirer (101) acquires a plurality of input signals including a target signal to be diagnosed for abnormality. The diagnoser (140) diagnoses, using a first index value relating to the target signal and a second index value relating to the plurality of input signals based on a correlation between the plurality of input signals, whether an abnormality occurs. The first index value indicates a degree of similarity of a waveform of the target signal to a predetermined reference waveform. The second index value is a value that is based on comparison between the target signal and a predetermined pattern and is calculated from values of the plurality of input signals.

8 Claims, 21 Drawing Sheets

(51) Int. Cl.
*G01M 99/00* (2011.01)
*G06Q 10/0639* (2023.01)
*G06Q 50/04* (2012.01)
*G07C 3/00* (2006.01)

(52) U.S. Cl.
CPC ....... *G06Q 10/06395* (2013.01); *G06Q 50/04* (2013.01); *G07C 3/005* (2013.01)

(56) References Cited

U.S. PATENT DOCUMENTS

| | | | | |
|---|---|---|---|---|
| 7,120,563 | B2* | 10/2006 | Bechhoefer | G01R 31/11 324/533 |
| 8,306,939 | B2* | 11/2012 | Kataoka | G01N 27/44717 706/52 |
| 2006/0161391 | A1* | 7/2006 | Inaba | G07C 5/0808 702/183 |
| 2012/0166142 | A1* | 6/2012 | Maeda | G05B 23/0227 702/185 |
| 2012/0290879 | A1* | 11/2012 | Shibuya | G05B 23/021 714/26 |
| 2013/0191107 | A1* | 7/2013 | Tonouchi | G06F 11/3485 703/21 |
| 2015/0363925 | A1* | 12/2015 | Shibuya | G06V 10/761 345/440 |
| 2020/0356951 | A1* | 11/2020 | Cristache | G06Q 10/10 |
| 2020/0410890 | A1* | 12/2020 | Yamada | A61B 5/055 |
| 2021/0001810 | A1* | 1/2021 | Rivard | B60R 25/25 |
| 2021/0022676 | A1* | 1/2021 | Lamego | A61B 5/02055 |
| 2022/0134547 | A1* | 5/2022 | Cristache | B25J 9/1617 700/245 |
| 2023/0211493 | A1* | 7/2023 | Cristache | B25J 9/0009 700/245 |

FOREIGN PATENT DOCUMENTS

| | | |
|---|---|---|
| EP | 1195681 A2 | 4/2002 |
| EP | 2131177 A1 | 12/2009 |
| JP | 2002-131123 A | 5/2002 |
| JP | 2003-021555 A | 1/2003 |
| JP | 2011-059790 A | 3/2011 |
| JP | 2011-065341 A | 3/2011 |
| JP | 2011-070635 A | 4/2011 |
| JP | 2014-142697 A | 8/2014 |
| JP | 2014-149840 A | 8/2014 |
| JP | 2017-215765 A | 12/2017 |
| TW | 462900 B | 11/2001 |
| TW | 463177 B | 11/2001 |
| WO | 2014/084214 A1 | 6/2014 |

OTHER PUBLICATIONS

Office Action dated Dec. 5, 2019, received for TW Application No. 108116338, 9 pages including English Translation.
Notice of Reasons for Refusal dated Jul. 9, 2019, received for JP Application No. 2019-521501, 4 pages including English Translation.
Decision to Grant dated Nov. 19, 2019, received for JP Application No. 2019-521501, 5 pages including English Translation.
Office Action dated Dec. 8, 2021, in corresponding German patent Application No. 11 2018 007 597.4, 9 pages.

* cited by examiner

OUTLINE OF CALCULATION OF SECOND
INDEX VALUE BY SECOND CALCULATOR

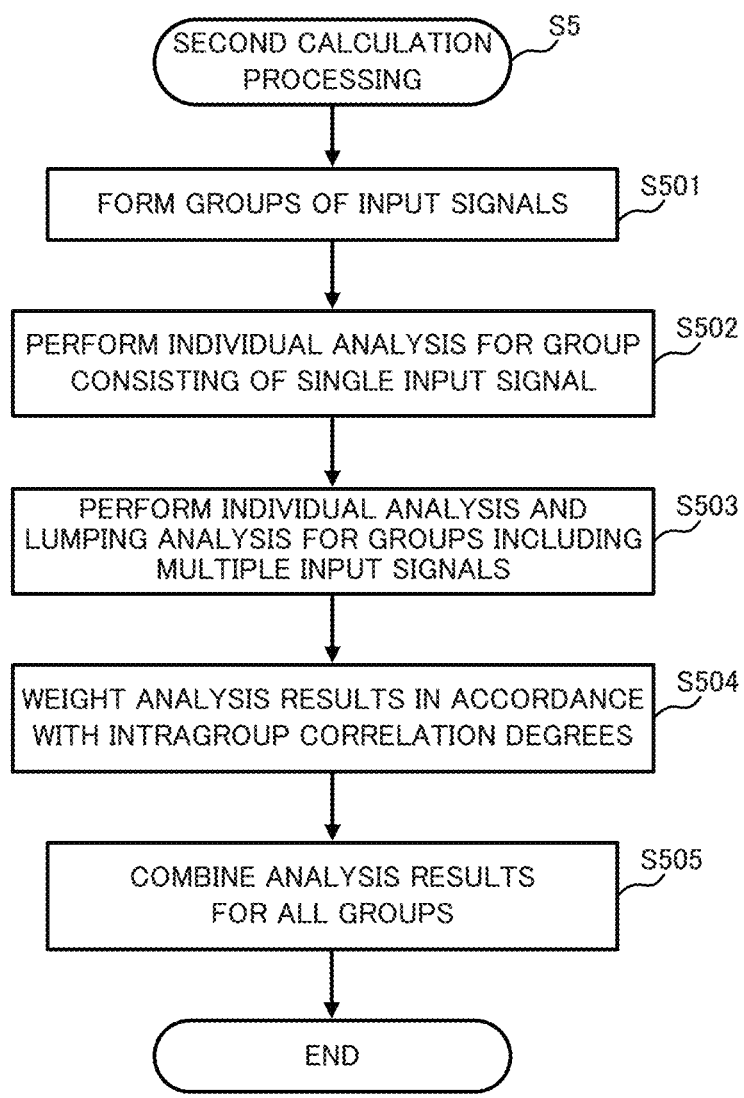

DIAGNOSTIC DEVICE, DIAGNOSTIC METHOD AND PROGRAM

CROSS-REFERENCE TO RELATED APPLICATION

The present application is based on PCT filing PCT/JP2018/023102, filed Jun. 18, 2018, the entire contents of which are incorporated herein by reference.

TECHNICAL FIELD

The present disclosure relates to a diagnostic device, a diagnostic method and a program.

BACKGROUND ART

Various types of processing systems that utilize time-series data output from a sensor are known, such as a production system and a control system in a factory. In such processing systems, diagnosing as to whether an abnormality occurs is widely performed from collected time-series data.

As a relatively simple method for diagnosing whether an abnormality occurs, a first method of diagnosing is conceivable in which the diagnosis is performed based on, among multiple time-series data items of multiple time series, a data item of a single time series. Specifically, diagnosing whether an abnormality occurs can be achieved by determining whether a to-be-monitored data item is similar to a data item that is to be input during normal operation. The first method enables quick detection of minor troubles indicated by a sensing result that is a result of sensing by one sensor.

Additionally, a second method of diagnosing whether an abnormality occurs by analyzing multiple time-series data items collectively is conceivable. For example, a technique of detecting an abnormality based on feature amounts extracted from the time-series data items can be employed (refer to, for example, Patent Literature 1). The second method enables detection of a state in which individual data items cannot be clearly determined to be abnormal but overall data items are to be determined to be abnormal.

CITATION LIST

Patent Literature

Patent Literature 1: Unexamined Japanese Patent Application Publication No. 2014-149840

SUMMARY OF INVENTION

Technical Problem

However, neither of the aforementioned two methods is sufficient to achieve full-elimination of erroneous detection, and there is a room for improvement in accuracy of diagnosing as to whether an abnormality occurs.

The present disclosure is made in view of the above-described circumstances, and an objective of the present disclosure is to improve accuracy of diagnosing whether an abnormality occurs.

Solution to Problem

To achieve the aforementioned objective, a diagnostic device according to the present disclosure includes:

acquisition means for acquiring a plurality of input signals including a target signal to be diagnosed for abnormality; and diagnosis means for diagnosing, using a first index value relating to the target signal and a second index value relating to the plurality of input signals based on a correlation between the plurality of input signals, whether an abnormality occurs, wherein the first index value indicates (i) a degree of similarity of a waveform of the target signal to a predetermined reference waveform or (ii) a degree of deviation of the waveform of the target signal from the predetermined reference waveform, and the second index value is a value that is based on comparison between the target signal and a predetermined pattern and is calculated using values of the plurality of input signals.

Advantageous Effects of Invention

According to the present disclosure, whether an abnormality occurs is diagnosed using (i) the first index value relating to the target signal and (ii) the second index value relating to the plurality of input signals, based on the correlation between the plurality of input signals. When a degree of the correlation between the input signals is relatively low, the first index value focused on individual input signals is considered to be effective for diagnosing whether an abnormality occurs. Also, when the degree of the correlation between the input signals is relatively high, the second index value relating to the plurality of input signals is considered to be effective for diagnosing whether an abnormality occurs. Thus, improvement in accuracy of diagnosing whether an abnormality occurs can be achieved by diagnosing whether an abnormality occurs using these two index values based on the correlation between the input signals.

BRIEF DESCRIPTION OF DRAWINGS

FIG. 21 is a flowchart of second calculation processing according to Embodiment 3.

DESCRIPTION OF EMBODIMENTS

Hereinafter, a diagnostic system 100 according to an embodiment of the present disclosure is described in detail with reference to the drawings.

Embodiment 1

Figure 1:
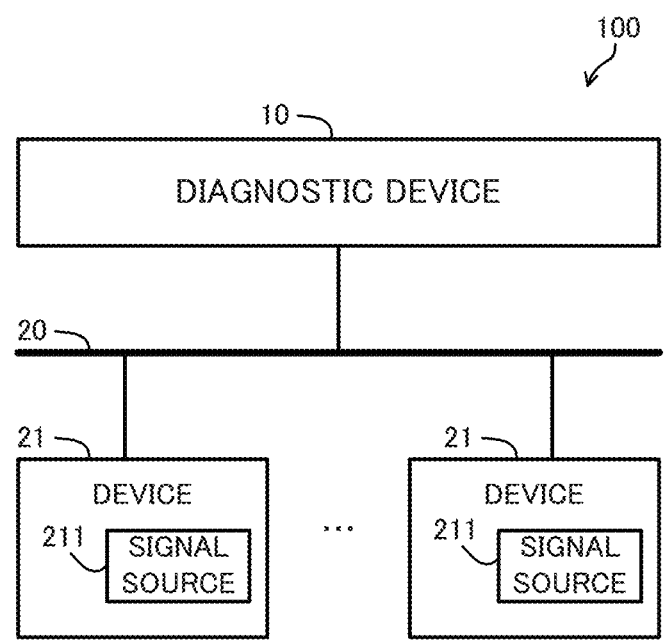
FIG. 1 is a block diagram illustrating configuration of a diagnostic system according to Embodiment 1 of the present disclosure.

The diagnostic system 100 according to the present embodiment corresponds to a part of a production system formed in a factory. The diagnostic system 100 collects data from a production system and diagnoses whether an abnormality occurs in the production system. The abnormality includes, for example, deviation from specification of a workpiece transported on a production line, malfunctioning of a device included in the production line, and errors that occur during operation of the device. The abnormality means a state that is different from a predetermined normal state assumed by an operator of the production system, and generally causes stopping of production of a product performed by the production system or lowers a yield of the product. Further, the diagnostic system 100 provides a user with information indicating a result of the diagnosis. As illustrated in FIG. 1, the diagnostic system 100 includes a diagnostic device 10 that diagnoses whether an abnormality occurs and devices 21 that each transmit a signal to the diagnostic device 10.

The diagnostic device 10 and the devices 21 are communicably connected to one another via a network 20. The network 20 is an industrial FA network. However, the network 20 is not limited to the industrial FA network and may be a wide area communication network or a dedicated line.

The devices 21 are, for example, a sensor device, an actuator, or a robot. Each of the devices 21 includes a sensor that serves as a signal source 211. Each of the devices 21 repeatedly sends, to the diagnostic device 10 via the network 20, notification of a result of sensing performed by the sensor, thereby transmitting to the diagnostic device 10 a digital signal indicating changes in the sensing result. The sensor is, for example, a pressure sensor, an illuminance sensor, an ultrasonic sensor, or other types of sensors. Each of the devices 21 transmits a signal of scalar values in time series that are obtained with a sampling period such as 10 milliseconds, 100 milliseconds, or one second.

When the devices 21 have multiple signal sources 211, the devices 21 may transmit multiple signals of multiple series. Further, the signal transmitted from the devices 21 is not limited to a signal of scalar values and may be a signal of vector values. Moreover, the devices 21 may transmit data to the diagnostic device 10 with a sampling period different from the sampling period employed by the sensor. For example, the devices 21 may, when sampling values sampled by the sensor are accumulated in a buffer to some degree, transmit data including the accumulated sampling values to the diagnostic device 10. The signal source 211 may be, for example, an oscillator that generates a signal for synchronizing the operations of the devices 21 included in the production system or may be a receiver or an antenna that communicates with another, remotely-positioned device.

Figure 2:
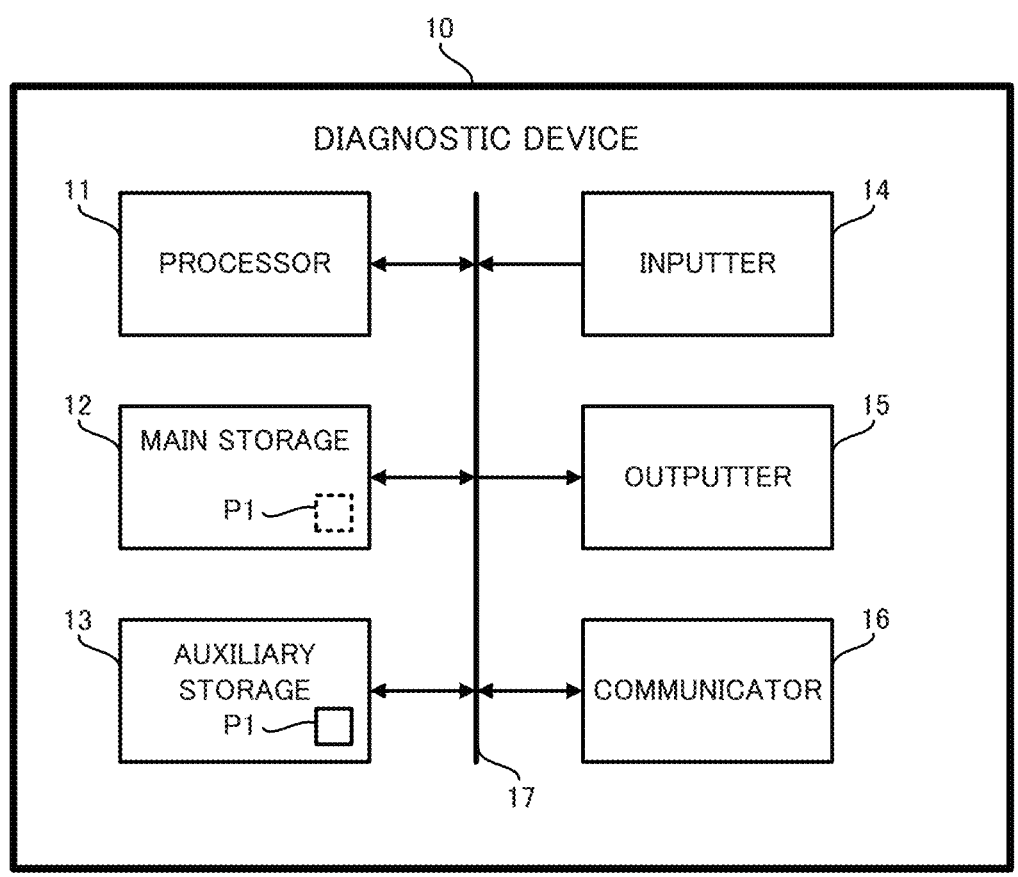
FIG. 2 illustrates hardware configuration of a diagnostic device according to Embodiment 1.

The diagnostic device 10 is an industrial personal computer (IPC) arranged in a factory. As illustrated in FIG. 2, the diagnostic device 10 includes, as hardware components, a processor 11, a main storage 12, an auxiliary storage 13, an inputter 14, an outputter 15, and a communicator 16. The main storage 12, the auxiliary storage 13, the inputter 14, the outputter 15, and the communicator 16 are connected to the processor 11 via an internal bus 17.

The processor 11 includes a central processing unit (CPU). The processor 11 executes a program P1 stored in the auxiliary storage 13 to achieve various types of functions of the diagnostic device 10, thereby executing processing described later.

The main storage 12 includes random access memory (RAM). The program P1 is loaded from the auxiliary storage 13 into the main storage 12. The main storage 12 is used by the processor 11 as a work area.

The auxiliary storage 13 includes a nonvolatile memory such as an electrically erasable programmable read-only memory (EEPROM) and a hard disk drive (HDD). The auxiliary storage 13 stores the program P1 and various types of data used for processing by the processor 11. The auxiliary storage 13 supplies, in accordance with instructions from the processor 11, to the processor 11 data to be used by the processor 11 and stores data supplied from the processor 11. Although FIG. 2 illustrates in a representative manner only one program (that is, the program P1), the auxiliary storage 13 may store multiple programs, and multiple programs may be loaded into the main storage 12.

The inputter 14 includes an input device such as input keys and a pointing device. The inputter 14 acquires information input by a user of the diagnostic device 10 and sends notification of the acquired information to the processor 11.

The outputter 15 includes an output device such as a liquid crystal display (LCD) and a speaker. The outputter 15 presents various types of information to the user in accordance with instructions from the processor 11.

The communicator 16 includes a network interface circuit for communicating with an external device. The communicator 16 receives a signal from the exterior and outputs data indicated by the signal to the processor 11. Further, the communicator 16 transmits to the external device a signal indicating data output from the processor 11.

The diagnostic device 10, by cooperation among the hardware components illustrated in FIG. 2, diagnoses whether an abnormality occurs and outputs information indicating a result of the diagnosis. Specifically, the diagnostic device 10, based on a result obtained by analyzing a plurality of signals individually and a result obtained by integrally analyzing the plurality of signals, determines whether an abnormality occurs.

Figure 3:
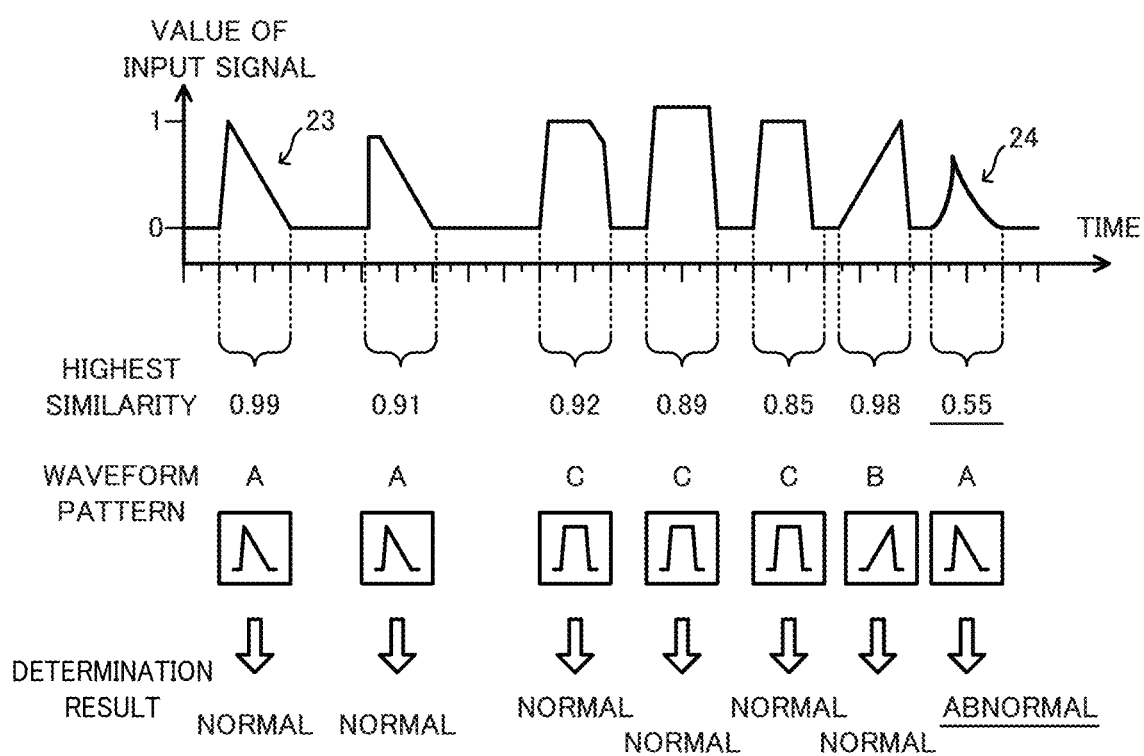
FIG. 3 is a first diagram for explanation of an outline of abnormality diagnosis according to Embodiment 1.

Here, a basic method employed by the diagnostic device 10 to perform the signal analyses is described with reference to FIGS. 3 and 4. FIG. 3 illustrates an outline of abnormality diagnosis. FIG. 3 illustrates, in the upper part thereof, one input signal that is input into the diagnostic device 10. During normal operation, this input signal has a waveform that is similar to any one of a plurality of waveform patterns. Thus, when the input signal has a waveform that deviates from any of the plurality of waveform patterns, a determination is made that an abnormality occurs.

As a result of comparison of the waveform 23 of the input signal that appears first in FIG. 3 with each of a plurality of waveform patterns A, B, and C, the highest similarity 0.99 is indicated when compared with the waveform pattern A. As the highest similarity exceeds a threshold value, the waveform 23 is determined to be normal. The similarity is a value indicating a degree of similarity between waveforms, ranges from zero to 1, and takes a value of 1 when the waveforms match each other. Although the similarity is calculated by normalizing a sum of squared errors between waveforms, this is not limiting, and the similarity may be calculated using other methods. An example of the threshold value is 0.8, and the threshold value may be set by the user or may be predetermined.

Subsequently, the waveforms of the input signal are determined in order as being most similar to the waveform patterns A, C, C, C, B, and A, and calculation of the similarity is performed, in order, as 0.91, 0.92, 0.89, 0.85, 0.98, and 0.55. Although the last waveform 24 is most similar to the waveform pattern A among the waveform patterns A, B, and C, such similarity is 0.55 and is lower than the threshold value. Thus, the last waveform 24 is determined to be abnormal.

Figure 4:
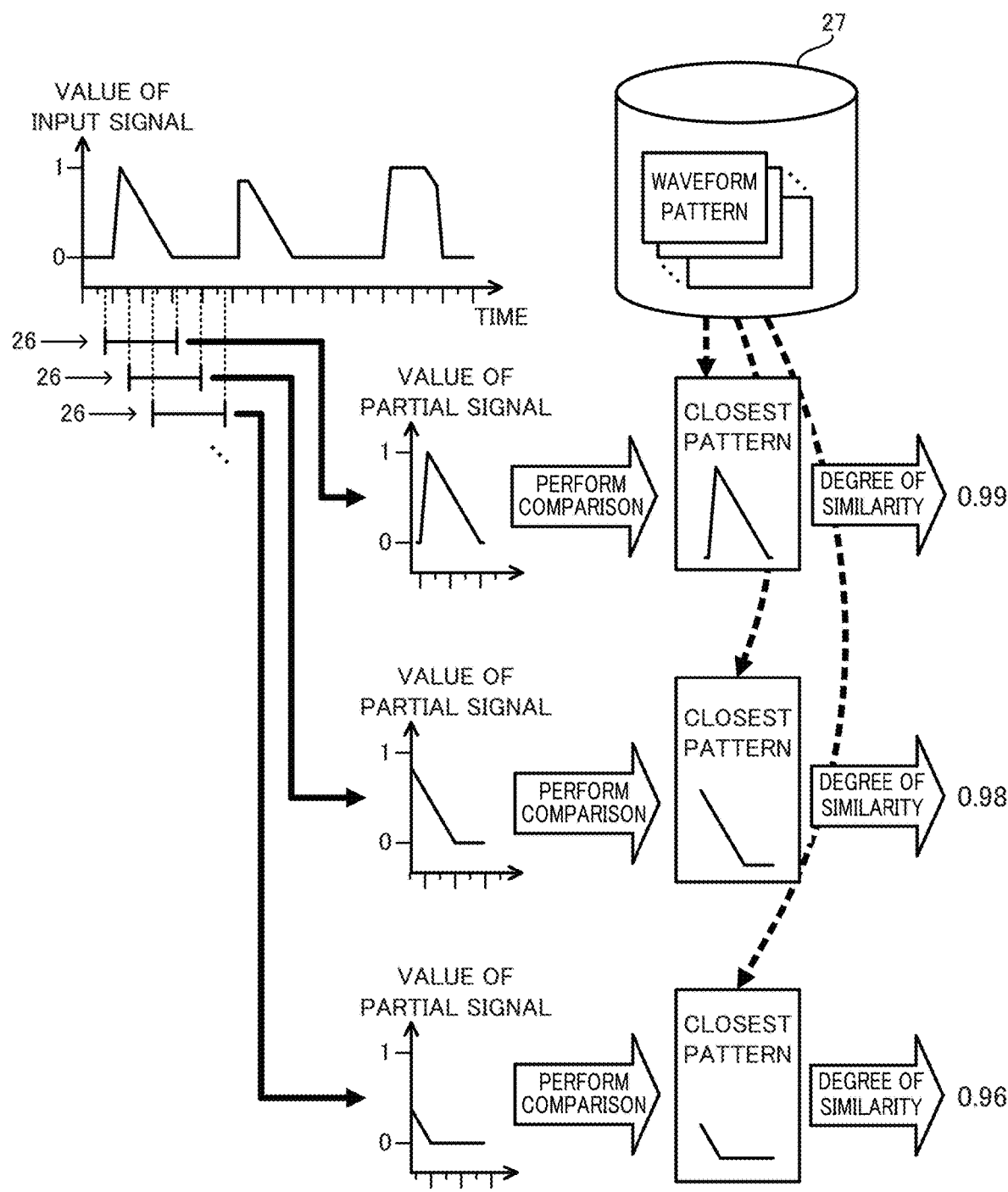
FIG. 4 is a second diagram for explanation of the outline of the abnormality diagnosis according to Embodiment 1.

FIG. 4 illustrates cutout of the input signal that is performed to compare the waveforms. As illustrated in FIG. 4, the diagnostic device 10 slides, with a fixed shift width, a window 26 of a predetermined width. The window 26 is a window for cutting out a part of the input signal and corresponds to, among a rectangular window function defined by a value of 1 for an interval and a value of zero for the other intervals, the interval for which the value becomes 1. The cutout of a part of the input signal is performed by multiplying the window function by the input signal. The diagnostic device 10, with each sliding of the window 26, cutouts from the input signal a partial signal of the interval corresponding to the window 26. Then the diagnostic device 10 extracts, from the waveform patterns stored in a memory 27 in advance, a waveform pattern that is the closest to the partial signal, and obtains the similarity that is a result of comparison between the partial signal and the closest waveform pattern. The closest waveform pattern means a waveform pattern that results in the highest similarity. The waveform patterns are waveforms that serve as references indicating the input signal during normal operation and are stored in the memory 27.

Regarding the waveform patterns, as illustrated in FIG. 4, the diagnostic device 10 stores, as the waveform patterns, patterns obtained by shifting in the time direction the waveforms to be input during normal operation, to determine whether an abnormality occurs for the partial signal cutout from the input signal with the predetermined width.

The diagnostic device 10 performs comparison of waveforms as described above using two methods and combines results that each are obtained using a corresponding method, thereby diagnosing whether an abnormality occurs. A first method of the two methods is a method of analyzing signals individually, and a second method of the two methods is a method of analyzing the signals integrally instead of analyzing the signals individually. Specifically, the first method is a method of obtaining a first index value for each signal using the method illustrated in FIGS. 3 and 4, and the second method is a method of obtaining a second index value by analyzing the signals collectively.

The first index value is a value that serves as an indicator indicating, for each signal, a degree of similarity to the waveform pattern, and corresponds to the similarity of a waveform of the individual signal. The second index value is a value that serves as an indicator indicating a degree of similarity of values of multiple signals to a multidimensional pattern, and corresponds to the similarity of multidimensional waveform.

Figure 5:
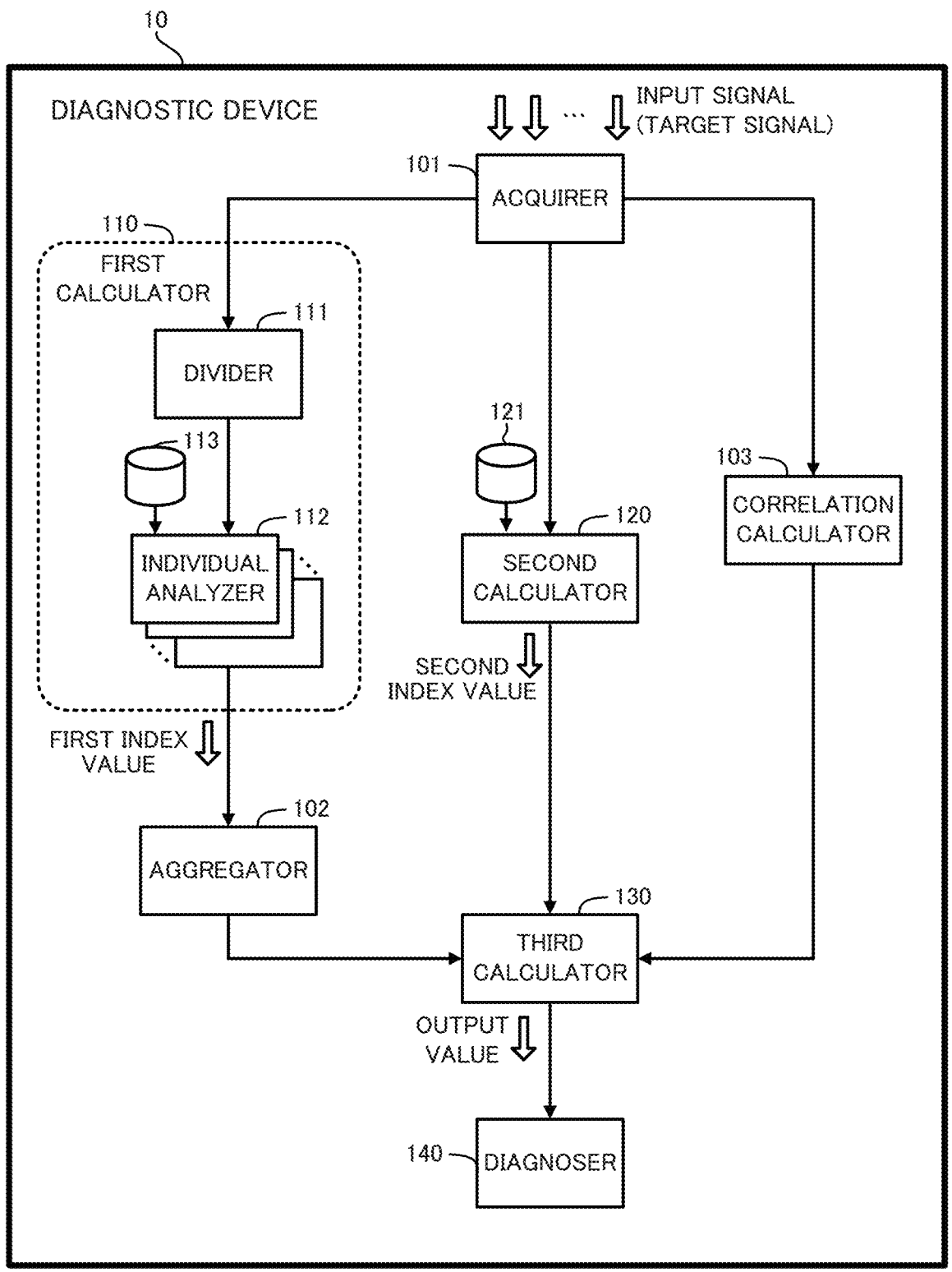
FIG. 5 illustrates functional configuration of the diagnostic device according to Embodiment 1.

As illustrated in FIG. 5, the diagnostic device 10 functionally includes: an acquirer 101 that acquires a plurality of the input signals; a first calculator 110 that analyzes the plurality of input signals individually and calculates the first index values; an aggregator 102 that aggregates the first index values; a second calculator 120 that analyzes the plurality of input signals collectively to calculate the second index value; a correlation calculator 103 that calculates a degree of correlation between the plurality of input signals; a third calculator 130 that calculates an output value using the first index values and the second index value based on the correlation between the plurality of input signals; and a diagnoser 140 that diagnoses, based on the output value, whether an abnormality occurs.

The acquirer 101 is mainly achieved by the processor 11 and the communicator 16. The acquirer 101 acquires, as the plurality of input signals, a plurality of target signals to be diagnosed for abnormality. Specifically, the acquirer 101 receives data repeatedly from the devices 21 via the network 20, thereby receiving the target signals that are generated by the signal sources 211. The acquirer 101 functions as the acquisition means in the claims.

The first calculator 110 includes a divider 111 that divides the plurality of target signals into individual target signals, an individual analyzer 112 that analyzes the divided target signals individually, and a storage 113 that stores waveform patterns used by the individual analyzer 112 to perform the analysis.

When, for example, the acquirer 101 receives data including results of sensing performed by a plurality of the sensors, extraction of sensing results that each correspond to a corresponding sensor is to be performed. In such a case, the divider 111 divides the plurality of target signals acquired by the acquirer 101 into individual target signals. However, the divider 111 may be omitted when the acquirer 101 acquires the target signals individually. The divider 111 is mainly achieved by the processor 11.

The individual analyzer 112 is mainly achieved by the processor 11. The individual analyzer 112 calculates, for individual target signals divided by the divider 111, the similarity using the method illustrated in FIGS. 3 and 4. Specifically, the individual analyzer 112 compares individual target signal with the waveform patterns stored in the storage 113 and calculates the similarities that serve as the first index values.

The storage 113 is mainly achieved by the auxiliary storage 13. In the storage 113, waveform patterns that each indicate a waveform that a corresponding target signal is to have during normal operation are stored in advance. Specifically, the storage 113 stores, for each of the target signals, one or more waveform patterns associated with an identifier for identification of the corresponding target signal. The waveform patterns may be stored in the storage 113 by the user of the diagnostic device 10 or may be generated by learning by the diagnostic device 10.

The aggregator 102 is mainly achieved by the processor 11. The aggregator 102 calculates a mean value of the first index values that each are calculated by the individual analyzer 112 for the corresponding target signal, thereby aggregating the first index values into one value. The aggregator 102 may aggregate the first index values by performing an operation different from the calculation of mean value.

Figure 6:
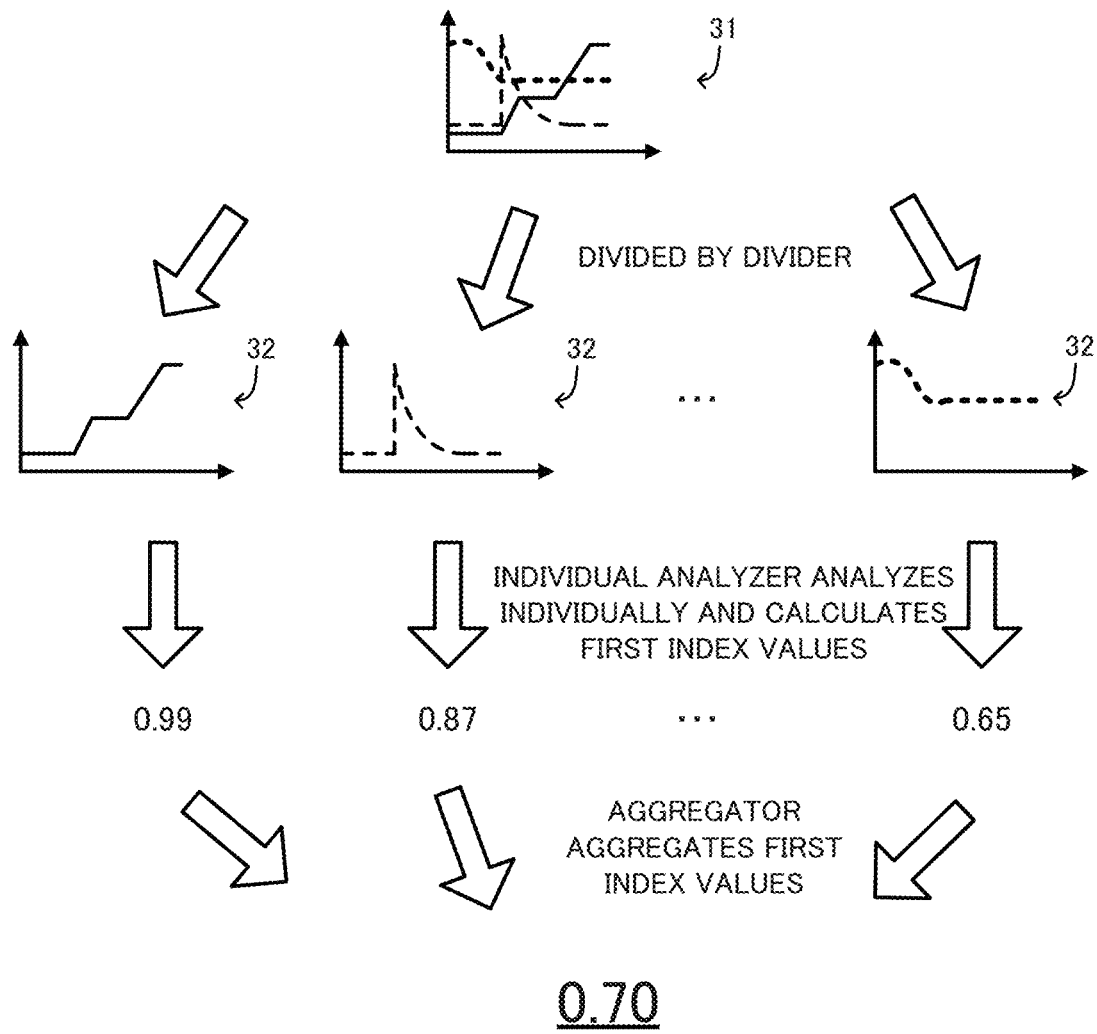
FIG. 6 is a diagram for explanation of an outline of calculation and aggregation of first index values according to Embodiment 1.

FIG. 6 illustrates an outline of the calculation of the first index values performed by the first calculator 110 and the aggregation of the first index values performed by the aggregator 102. As illustrated in FIG. 6, a plurality of target signals 31 is divided by the divider 111 into individual target signals 32. Then the individual analyzer 112 analyzes the target signals 32 individually and calculates the first index values. FIG. 6 illustrates "0.99", "0.87", and "0.65" as example values of the first index values. The aggregator 102 aggregates these first index values and calculates the mean value of "0.70".

Again with reference to FIG. 5, the second calculator 120 is mainly achieved by the processor 11. The second calculator 120 compares the waveforms of the plurality of target signals acquired by the acquirer 101 with a multidimensional waveform pattern read from a storage 121 and calculates the second index value indicating a degree of the similarity of these waveforms.

Figure 7:
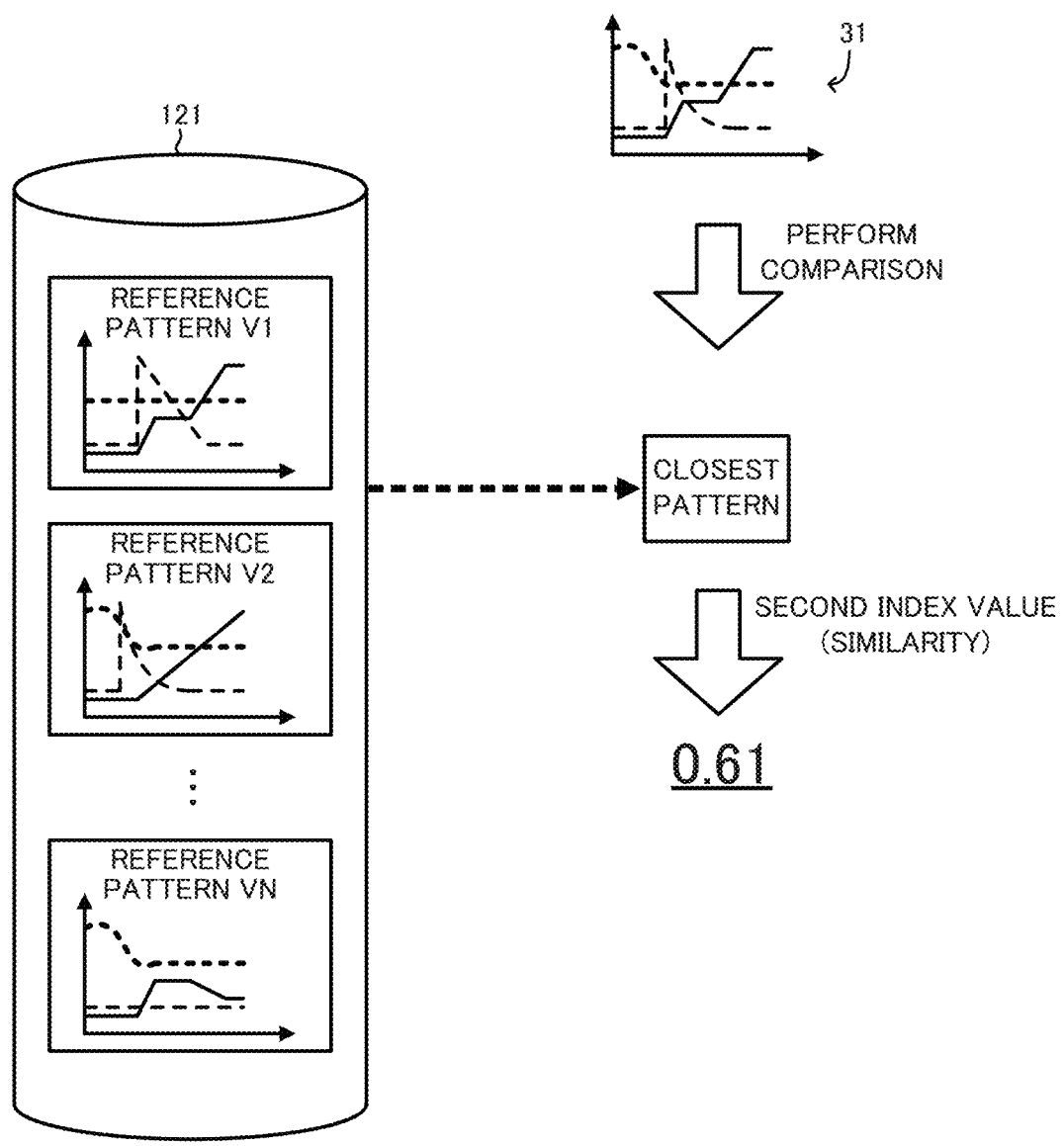
FIG. 7 is a diagram for explanation of an outline of calculation of a second index value that is performed by a second calculator according to Embodiment 1.

FIG. 7 illustrates an outline of the calculation of the second index value performed by the second calculator 120. As illustrated in FIG. 7, the plurality of target signals 31 is compared with each of reference patterns V1-VN stored in the storage 121, a reference pattern that is the closest to the plurality of target signals 31 is extracted from the reference patterns V1-VN, and then the second index value is calculated. The closest pattern means a pattern that has the highest similarity to the plurality of target signals 31 among the reference patterns V1-VN. The highest similarity is employed as the second index value. The similarity is a value ranging from zero to 1 and takes a value of 1 when the waveforms of the plurality of signals match any one of the reference patterns. The similarity is calculated by considering the plurality of target signals 31 and the reference patterns as transition of vector values and normalizing a sum of square errors between the vector values. The square errors between the vector values are values obtained by squaring distances between the vector values. The second index value is calculated as described above and usually takes a value different from the aggregated first index value.

Again with reference to FIG. 5, the correlation calculator 103 is mainly achieved by the processor 11. The correlation calculator 103 calculates a degree of correlation between the target signals. Specifically, the correlation calculator 103 calculates a correlation coefficient between the target signals. In the case where the number of the target signals is three or more, the correlation calculator 103 calculates a correlation matrix for the target signals, thereby calculating a mean value of off-diagonal elements. That is to say, the correlation calculator 103 calculates a mean value of all correlation coefficients for all combinations of the target signals. The correlation calculator 103 functions as the correlation calculation means in the claims.

The target signals for which a degree of correlation is calculated by the correlation calculator 103 may be the partial signals that are cutout by the window 26 illustrated in FIG. 4 or may be all of target signals acquired between activation time of the diagnostic device 10 and the current time. Further, the correlation calculator 103 may calculate, as the degree of correlation, a value different from the correlation coefficient. For example, the correlation calculator 103 may calculate measures of independence such as mutual information amounts.

The third calculator 130 is mainly achieved by the processor 11. The third calculator 130 calculates, using the first index value obtained as a result of the aggregation by the aggregator 102 and the second index value calculated by the second calculator 120 based on the correlation between the plurality of target signals, an output value relating to an abnormality in the plurality of target signals. Specifically, the third calculator 130 calculates, using weights corresponding to the correlation coefficient calculated by the correlation calculator 103, a weighted sum of the first index value and the second index value. More specifically, the third calculator 130 performs an operation expressed by the formula (1) below, thereby calculating an output value A3.

$$A3 = w1 \cdot A1 + w2 \cdot A2 \tag{1}$$

Figure 8:
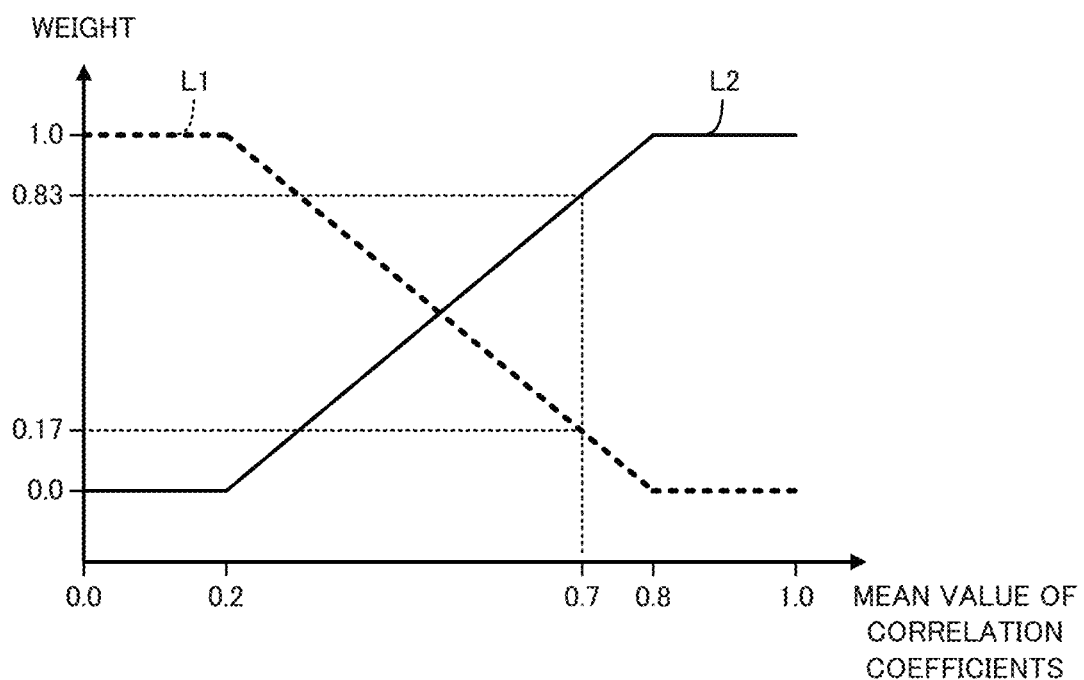
FIG. 8 illustrates weighting coefficients according to Embodiment 1.

Here, A1 corresponds to the first index value, w1 is a weighting coefficient of the first index value, A2 corresponds to the second index value, and w2 is a weighting coefficient of the second index value. The weighting coefficients w1 and w2 are predetermined in accordance with the correlation coefficients. FIG. 8 illustrates examples of w1 and w2. In FIG. 8, the line L1 indicates the weighting coefficient w1 corresponding to the mean value of the correlation coefficients, and the line L2 indicates the weighting coefficient w2 corresponding to the mean value of the correlation coefficients. For example, in the case where the mean value of the correlation coefficients is 0.7, the weighting coefficient w1 is 0.17 and the weighting coefficient w2 is 0.83. Usually the sum of w1 and w2 is 1.0 and the output value is a value ranging from zero to 1.

The diagnoser 140 is mainly achieved by the processor 11, the outputter 15, or the communicator 16. The diagnoser 140 diagnoses, based on the output value calculated by the third calculator 130, whether an abnormality occurs. The diagnoser 140 diagnoses whether an abnormality occurs by, for example, determining whether the output value exceeds a threshold value. An example value of this threshold value is 0.8, for example, and this threshold value may be predetermined or may be changed by the user. The output of information of the result of the diagnosis by the diagnoser 140 may be performed by displaying the information on a display to present the information to the user, by outputting the information to a signal processing circuit included in the diagnostic device 10, or by transmitting data via the network 20. The diagnoser 140 functions as the diagnosis means in the claims.

Figure 9:
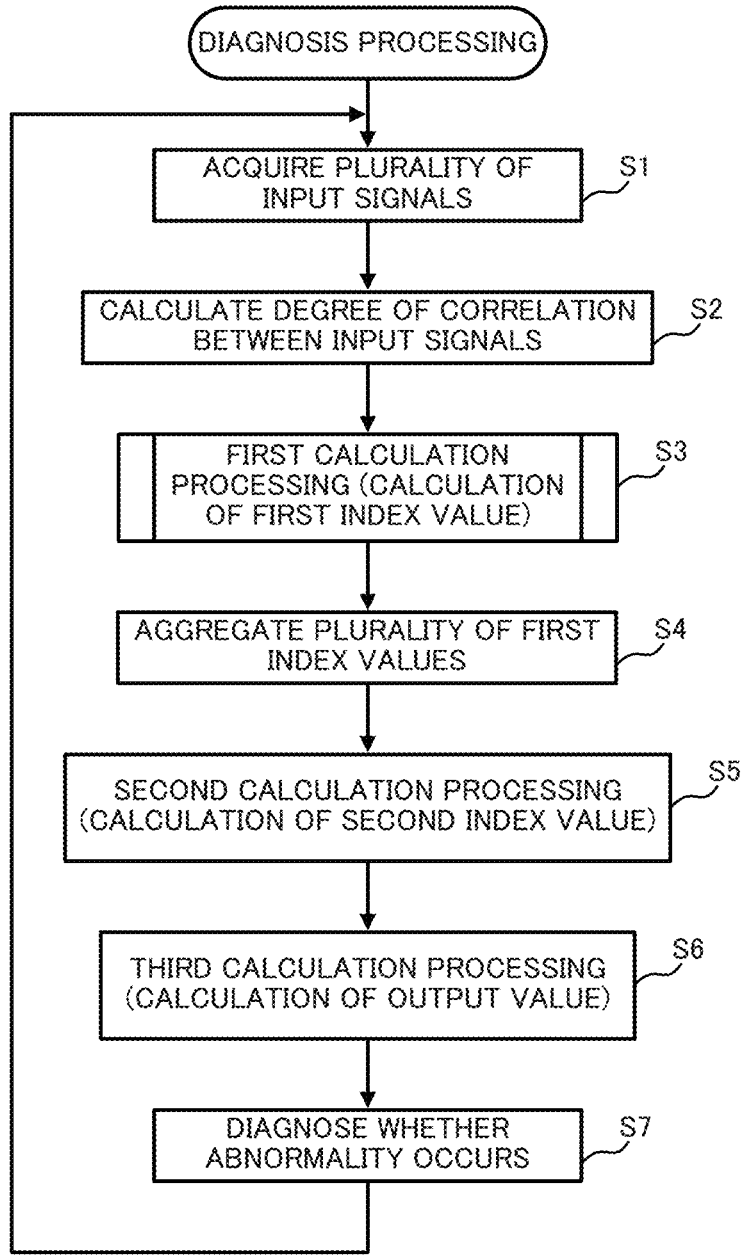
FIG. 9 is a flowchart of diagnosis processing according to Embodiment 1.
Figure 10:
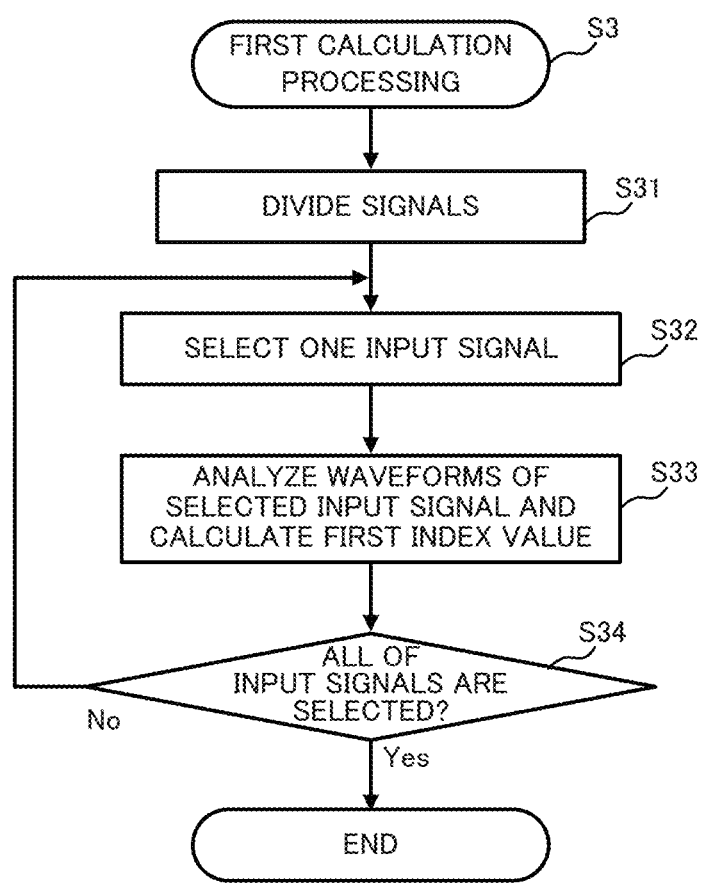
FIG. 10 is a flowchart of first calculation processing according to Embodiment 1.

Next, diagnosis processing executed by the diagnostic device 10 is described with reference to FIGS. 9-10. The diagnosis processing illustrated in FIG. 9 is started by powering up of the diagnostic device 10.

In the diagnosis processing, the diagnostic device 10 acquires a plurality of input signals (step S1). Specifically, the acquirer 101 acquires, as the plurality of input signals, a plurality of the target signals of two or more series. These target signals correspond to the partial signals that are cutout using the window 26 illustrated in FIG. 4. This step S1 corresponds to the acquisition step in the claims.

Then the diagnostic device 10 calculates a degree of correlation between the input signals (step S2). Specifically, the correlation calculator 103 calculates the correlation coefficient between the target signals. In the case where the number of the target signals is three or more, the correlation calculator 103 calculates a mean value of all correlation coefficients between the target signals.

Then the diagnostic device 10 executes first calculation processing (step S3). The first calculation processing is processing for calculating the first index value for each of the target signals acquired in step S1. This first calculation processing is described with reference to FIG. 10.

In the first calculation processing, the first calculator 110 divides signals (step S31). Specifically, the divider 111 divides the target signals of multiple series that are acquired as the input signals into individual target signals.

Then the first calculator 110 selects one input signal (step S32). Specifically, the first calculator 110 acquires a target signal of a series that is not already selected.

Then the first calculator 110 analyzes waveforms of the selected input signal and calculates the first index value (step S33). Specifically, the individual analyzer 112 sets, as the first index value, a similarity calculated for a waveform pattern, included in waveform patterns that are predetermined to correspond to the selected target value, that is the closest to the target signal.

Then the first calculator 110 determines whether all of the input signals are selected (step S34). When a determination is made that all of the input signals are not selected (NO in step S34), the first calculator 110 repeats the processing in step S32 and beyond, thereby calculating the first index values for individual series of target signals. When a determination is made that all of the input signals are selected (YES in step S34), the first calculation processing ends.

Again with reference to FIG. 9, following the first calculation processing, the diagnostic device 10 aggregates a plurality of the first index values (step S4). Specifically, the aggregator 102 calculates a mean value of the first index values calculated in the first calculation processing.

Then the diagnostic device 10 executes second calculation processing (step S5). Specifically, the second calculator 120 specifies a multidimensional pattern that is the closest to the plurality of target signals acquired in step S1, and calculates, as the second index value, a degree of similarity between the plurality of target signals and the specified pattern.

Then the diagnostic device 10 executes third calculation processing (step S6). Specifically, the third calculator 130, using weights corresponding to the degree of correlation calculated in step S2, sums the first index value obtained as a result of the aggregation in step S4 and the second index value calculated in step S5, thereby calculating the output value.

Then the diagnoser 140 of the diagnostic device 10 diagnoses whether an abnormality occurs (step S7). This step S7 corresponds to the diagnosis step in the claims. Thereafter, the diagnostic device 10 repeats the processing in step S1 and beyond, thereby performing sequential diagnoses as to whether an abnormality occurs for the plurality of partial signals that are cutout from the plurality of input signals, similarly to sequential calculation of similarities by way of the sliding of the window 26 illustrated in FIG. 4.

As described above, according to the diagnostic device 10, whether an abnormality occurs is diagnosed using the first index value relating to the target signals and the second index value relating to the plurality of input signals based on the correlation between the plurality of input signals. When the degree of correlation between the input signals is relatively low, the first index value focused on individual input signals is considered to serve as an index that is effective for diagnosing whether an abnormality occurs. Also, when the degree of correlation between the input signals is relatively high, the second index value relating to the plurality of input signals is considered to serve as an index that is effective for diagnosing whether an abnormality occurs. Thus, improvement in accuracy of diagnosing whether an abnormality occurs can be achieved by diagnosing whether an abnormality occurs using these two index values based on the correlation between the input signals.

Furthermore, the acquirer 101 acquires multiple target signals as the input signals, the first index values each indicate a degree of similarity of a waveform of the corresponding target signal to a reference waveform that is a waveform serving as a reference and being predetermined to correspond to the corresponding target signal, the second index value indicates a degree of similarity of the plurality of target signals to a multidimensional pattern, and the output value is calculated using the first index value and the second index value. Thus, in the case where all of the input signals are to be diagnosed for abnormality, information relating to the output value, which is obtained by combining (i) the first index value calculated as a result of focusing on individual signal waveforms and (ii) the second index value calculated by treating a plurality of signal waveforms collectively, is output. This enables more accurate diagnosis of an abnormality than diagnosis using one of the first index value or the second index value.

Furthermore, the output value is equivalent to a weighted sum of the first index value and the second index value that is calculated using weights corresponding to the correlation between the input signals. Thus, calculation of the output value can be achieved easily, that is, with less computation load.

Furthermore, as the degree of correlation between the input signals becomes higher, the weighting coefficient of the first index value becomes smaller and the weighting coefficient of the second index value becomes larger. In other words, the result of analysis that combines the plurality of input signals is increasingly emphasized as the correlation between the input signals increases. When the input signals are correlated with each other, improvement of the accuracy of the diagnosis is considered to be enabled by determining whether an abnormality occurs based on, rather than focus on individual signals, focus on the overall signals.

Figure 11:
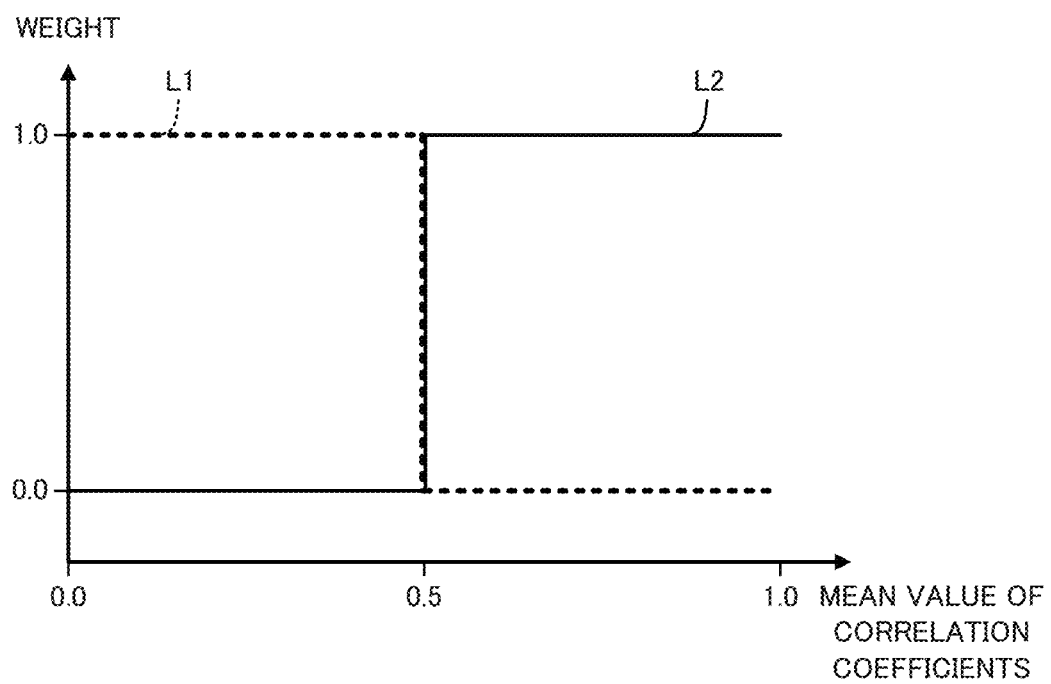
FIG. 11 illustrates weighting coefficients according to a modified example of Embodiment 1.

Determination of the weighting coefficient of the first index value and the weighting coefficient of the second index value are not limited to the example illustrated in FIG. 8 and may be determined by the lines L1 and L2 as illustrated in FIG. 11. In employing the weighting coefficients determined as illustrated in FIG. 11, a value lower than "0.5" of a mean value of the correlation coefficients leads to employment of the first index value as the output value, and a value higher than "0.5" of the mean value of the correlation coefficients leads to employment of the second index value as the output value. That is to say, one of the first index value or the second index value is output, the switching between indexes being performed in accordance with the degree of correlation of the input signals.

Embodiment 2

Next, Embodiment 2 is described with focus on differences from Embodiment 1 described above. In the present embodiment, components that are the same or equivalent to those of the above-described embodiment are denoted with the same reference signs, and explanation for such components is omitted or simplified. In Embodiment 1, all of the input signals are the target signals to be diagnosed for abnormality. However, the improvement in accuracy of diagnosing for target signals whether an abnormality occurs is conceivable as being achieved using signals different from the target signals. Hereinafter, an embodiment in which the input signals include a target signal and signals different from the target signal is described with reference to FIGS. 12-18.

A diagnostic device 10 according to the present embodiment calculates the second index value using values of both the target signal and the signals different from the target signal. Specifically, the diagnostic device 10 calculates the second index value by switching, in accordance with the values of the signals different from the target signal, a reference pattern to be compared with waveforms of the target signal. The diagnostic device 10 learns in advance a plurality of the reference patterns among which the switching is performed.

Figure 12:
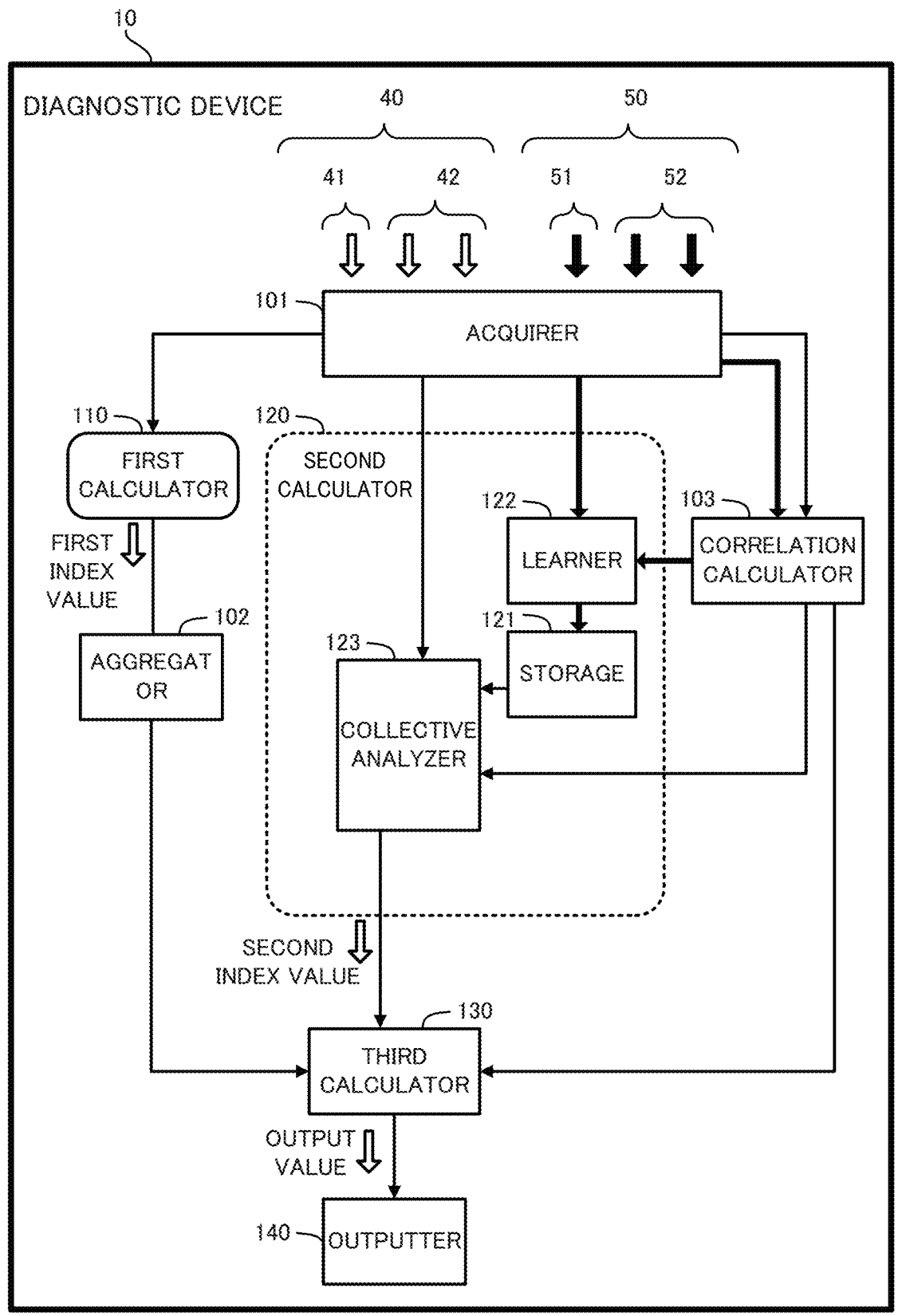
FIG. 12 illustrates functional configuration of a diagnostic device according to Embodiment 2.

As illustrated in FIG. 12, the acquirer 101 of the diagnostic device 10 acquires, in addition to the input signals 40, learning signals 50 that are used to learn the reference patterns. The input signals 40 include a target signal 41 and control signals 42 that are used to control the devices 21. Each of the control signals 42 is, for example, a signal that specifies an operation mode for the device 21 or a signal that specifies a moving speed of a workpiece. The learning signals 50 include a target learning signal 51 that is used to learn waveforms of the target signal and control learning signals 52 corresponding to the control signals. The target learning signal 51 is a signal that has waveforms that the target signal 41 is to have during normal operation, and is provided by the user. Each of the control learning signals 52 is a signal indicating values that the corresponding control signal 42 is to indicate during normal operation, and is provided by the user. Hereinafter, an example is described in which the acquirer 101 acquires (i) the input signals 40 including one target signal 41 and two control signals 42 and (ii) the learning signals 50 including one target learning signal 51 and two control learning signals 52.

The acquirer 101 may acquire the learning signals 50 via the network 20 or may extract the learning signals 50 from data that the user stores in a storage device. In employing the configuration in which the learning signals 50 are read from the storage device, the acquirer 101 is mainly achieved by the processor 11.

In FIG. 12, a flow of data in learning the reference patterns from the learning signals 50 is illustrated using thick lines, and a flow of data in performing a diagnosis as to whether an abnormality occurs that is performed after the learning and based on the input signals 40 is illustrated using thin lines. The acquirer 101 sends the acquired learning signals 50 to the correlation calculator 103 and to a learner 122 included in the second calculator 120. A length of the learning signals 50 acquired by the acquirer 101 is, although being freely determined by the user, usually desirable to be longer to ensure the learning of the reference patterns.

The second calculator 120 includes, in addition to the storage 121 that stores the reference patterns, the learner 122 that learns the reference patterns and a collective analyzer 123 that analyzes the input signals collectively.

The learner 122 acquires from the correlation calculator 103 degrees of correlation between the learning signals and specifies, based on the acquired degrees of correlation of the learning signals 50, a control learning signal 52 suitable for learning the reference patterns among the control learning signals 52. Specifically, the learner 122 specifies, as a correlation signal, a control learning signal 52 correlated to the target learning signal 51. Then the learner 122 learns from the target learning signal 51 the reference patterns corresponding to values of the specified correlation signal.

The learner 122 stores the learned reference patterns in the storage 121. The learner 122 functions as the learning means in the claims.

The collective analyzer 123 calculates the second index value using the input signals 40. Specifically, the collective analyzer 123 acquires, from the correlation calculator 103, an identifier for specifying the correlation signal. Then the collective analyzer 123 calculates, as the second index value, similarity between the waveforms of the target signal 41 and a reference pattern corresponding to a value of the control signal 42 corresponding to the correlation signal.

Figure 13:
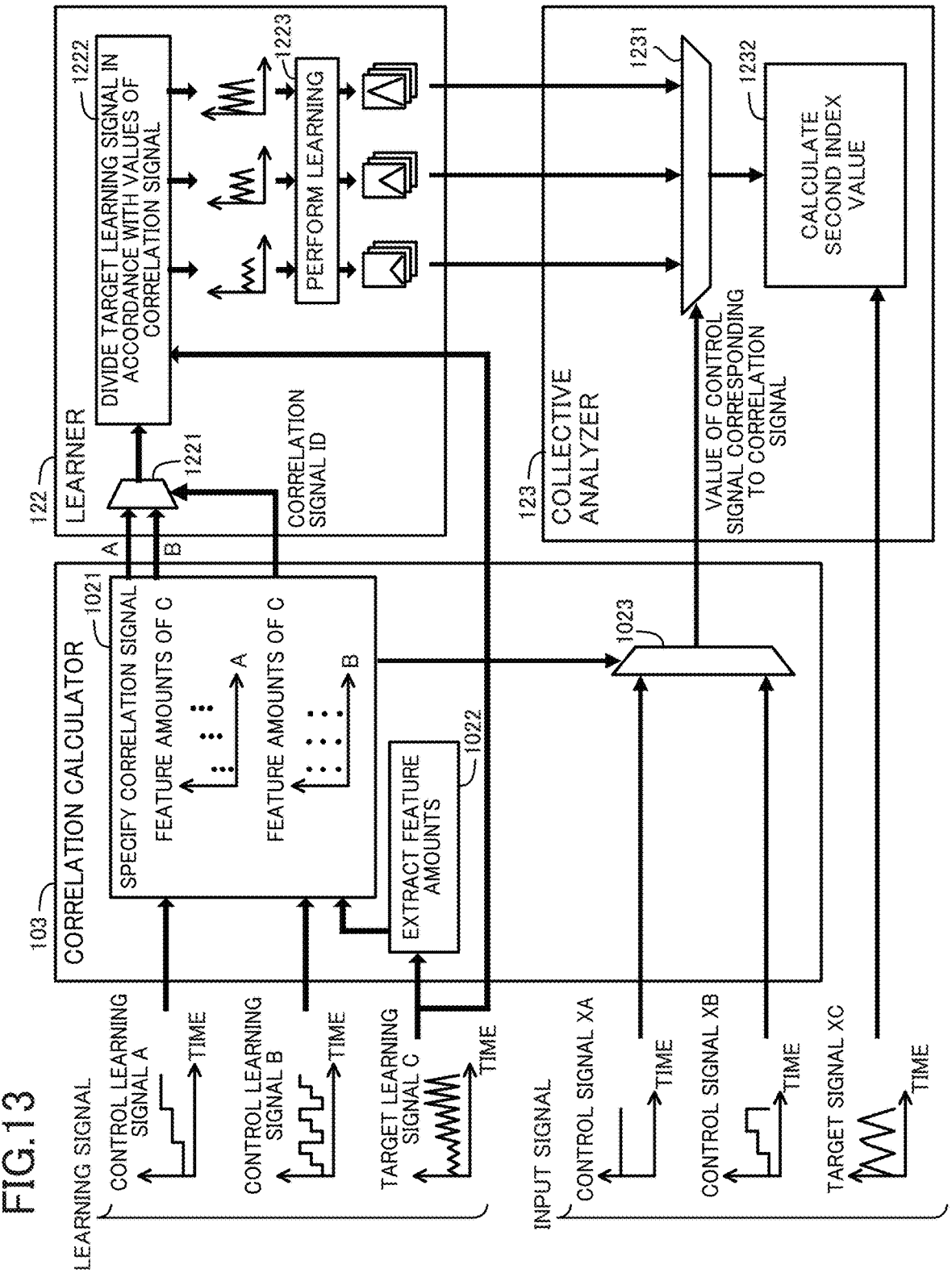
FIG. 13 illustrates detailed functions of the diagnostic device according to Embodiment 2.

FIG. 13 schematically illustrates details of functions of the diagnostic device 10. The upper part of FIG. 13 illustrates a function for learning the reference patterns from the learning signals, and the lower part of FIG. 13 illustrates a function for diagnosing, from the input signals, whether an abnormality occurs.

As illustrated in FIG. 13, the diagnostic device 10 acquires, as the learning signals, control learning signals A, B and a target learning signal C. Then the correlation calculator 103, in a module 1022, extracts feature amounts from the target learning signal C. The feature amounts are statistics such as a mean value and standard deviation. The correlation calculator 103, in a module 1021, calculates correlation between the control learning signal A and the feature amounts extracted from the target learning signal C and correlation between the control learning signal B and the feature amounts extracted from the target learning signal C, and specifies, as the correlation signal, a signal of the control learning signals A and B that has the highest degree of correlation to the target learning signal C. In the example illustrated in FIG. 13, the control learning signal A is more correlated to the feature amounts of the target learning signal C, and thus the control learning signal A is specified as the as the correlation signal. The module 1021 sends, to the learner 122, the control learning signals A and B and the identifier indicating the correlation signal.

The learner 122, using a selector 1221, selects the specified control learning signal A as the correlation signal from the control learning signals A and B. Then the learner 122, in a module 1222, divides the target learning signal in accordance with the values of the correlation signal. Specifically, the learner 122 performs clustering of the values of the correlation signal and divides the target learning signal into divided signals that correspond to the values of the correlation signal that each belong to a corresponding cluster. In the example of FIG. 13, control learning signal A indicates three values. When these three values are referred to as "high", "medium", and "low", for example, the learner 122 obtains, by dividing the target learning signal C, (i) a divided signal corresponding to the "high" value of the control learning signal A, (ii) a divided signal corresponding to the "medium" value of the control learning signal A, and (iii) a divided signal corresponding to the "low" value of the control learning signal A.

The learner 122, in a module 1223, learns from each of the divided signals a reference pattern. Specifically, the learner 122 learns, for each of the divided signals, one or more waveforms representative of the corresponding divided signal, as the reference pattern.

The diagnostic device 10, after learning the reference patterns, acquires the input signals. The correlation calculator 103, using a selector 1023, selects from control signals XA and XB the control signal XA corresponding to the correlation signal, and the values of the selected control signal XA are output to the collective analyzer 123. The selector 1023 may be included in the collective analyzer 123.

The collective analyzer 123, using a selector 1231, selects from the learned reference patterns a pattern corresponding to the value of the control signal. In the example illustrated in FIG. 13, the control signal XA has a "high" value, and thus the reference pattern that is learned as a reference pattern corresponding to the "high" value of the correlation signal is selected.

The collective analyzer 123, in a module 1232, compares the reference pattern selected by the selector 1231 and waveforms of a target signal XC to calculate the second index value.

Figure 14:
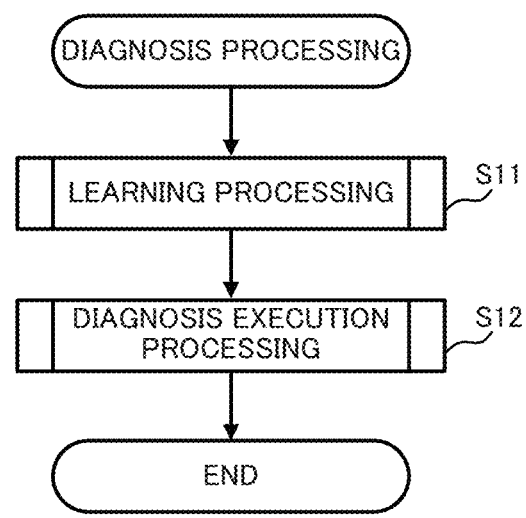
FIG. 14 is a flowchart of diagnosis processing according to Embodiment 2.

Next, diagnosis processing executed by the diagnostic device 10 is described with reference to FIGS. 14-18. As illustrated in FIG. 14, in the diagnosis processing, the diagnostic device 10 executes learning processing (step S11) and executes diagnosis execution processing (step S12). Hereinafter the learning processing and the diagnosis execution processing are described in order.

Figure 15:
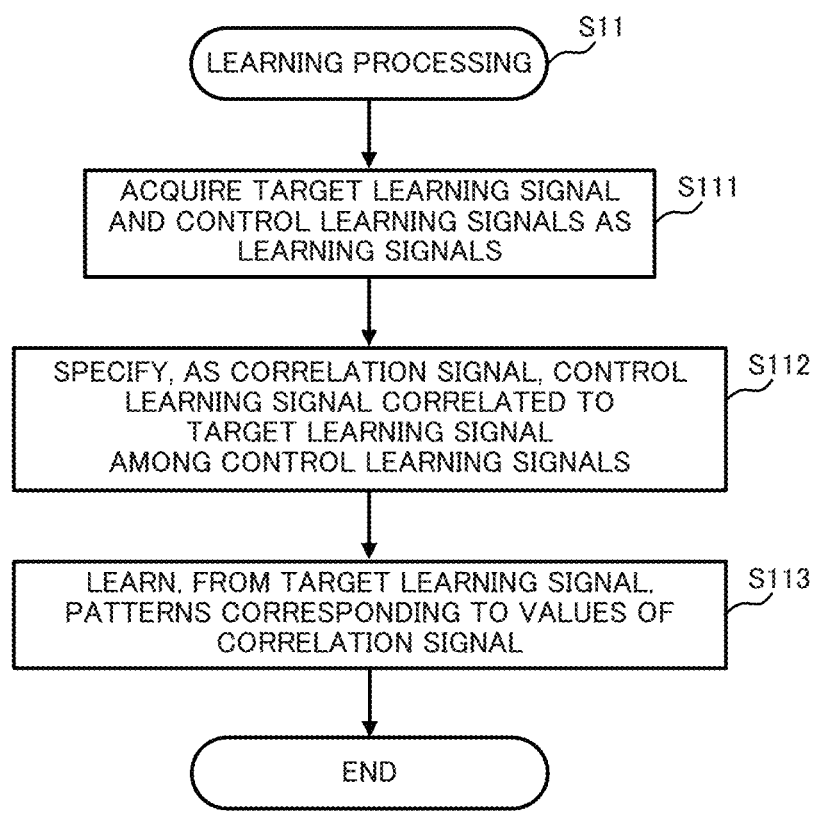
FIG. 15 is a flowchart of learning processing according to Embodiment 2.

As illustrated in FIG. 15, in the learning processing, the diagnostic device 10 acquires the target learning signal and the control learning signals as the learning signals (step S111). Specifically, the acquirer 101 acquires the target learning signal and the control learning signals as the learning signals.

Then the diagnostic device 10 specifies, as the correlation signal, a control learning signal correlated to the target learning signal among the control learning signals (step S112). Specifically, the correlation calculator 103 calculates correlation coefficients between each of the control learning signals and the target learning signal and specifies a control learning signal that has the largest correlation coefficient.

Then the learner 122 of the diagnostic device 10 learns, from the target learning signal, patterns corresponding to the values of the correlation signal (step S113). Thereafter, the learning processing ends.

Figure 16:
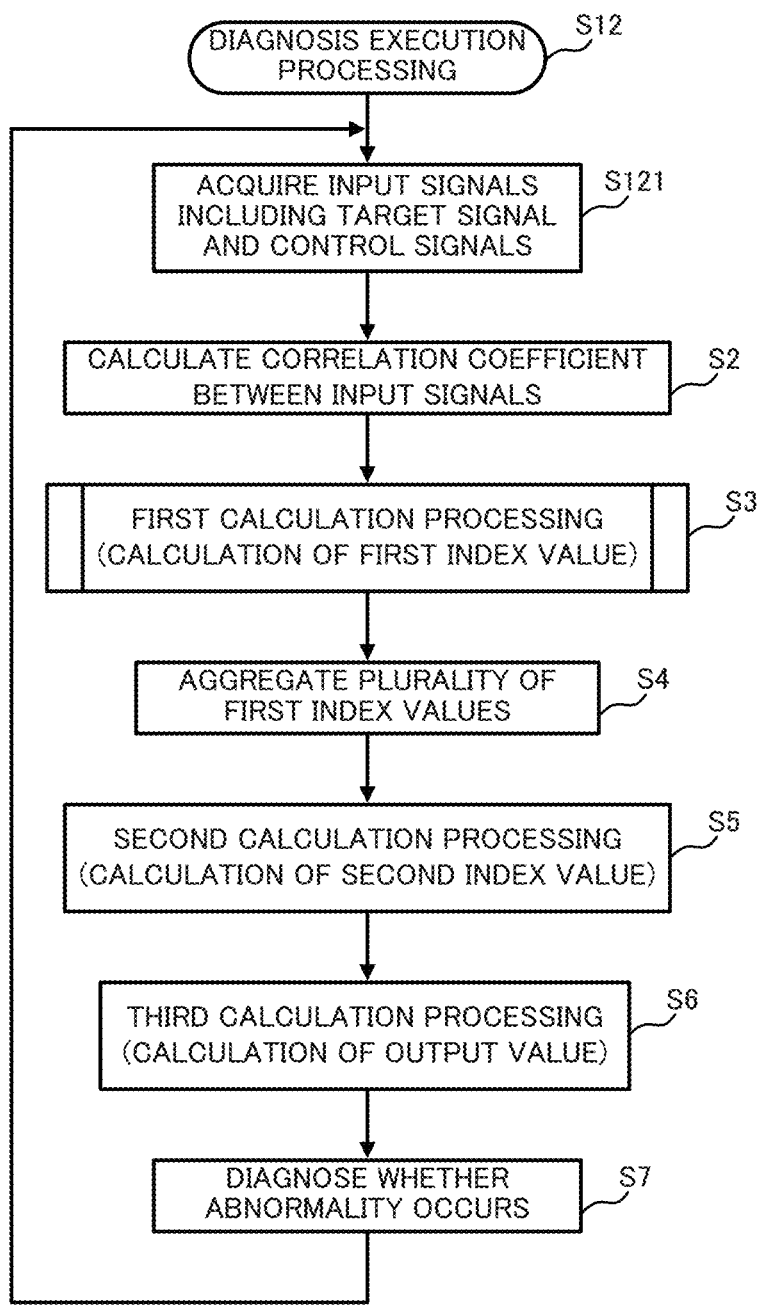
FIG. 16 is a flowchart of diagnosis execution processing according to Embodiment 2.

Next, the diagnosis execution processing is described. As illustrated in FIG. 16, in the diagnosis execution processing, the diagnostic device 10 acquires the input signals including the target signal and the control signals (step S121).

Then the diagnostic device 10 executes steps S2-S7 corresponding to the diagnosis processing according to Embodiment 1. Hereinafter, a first calculation processing in step S3 and a second calculation processing in step S4 are described.

Figure 17:
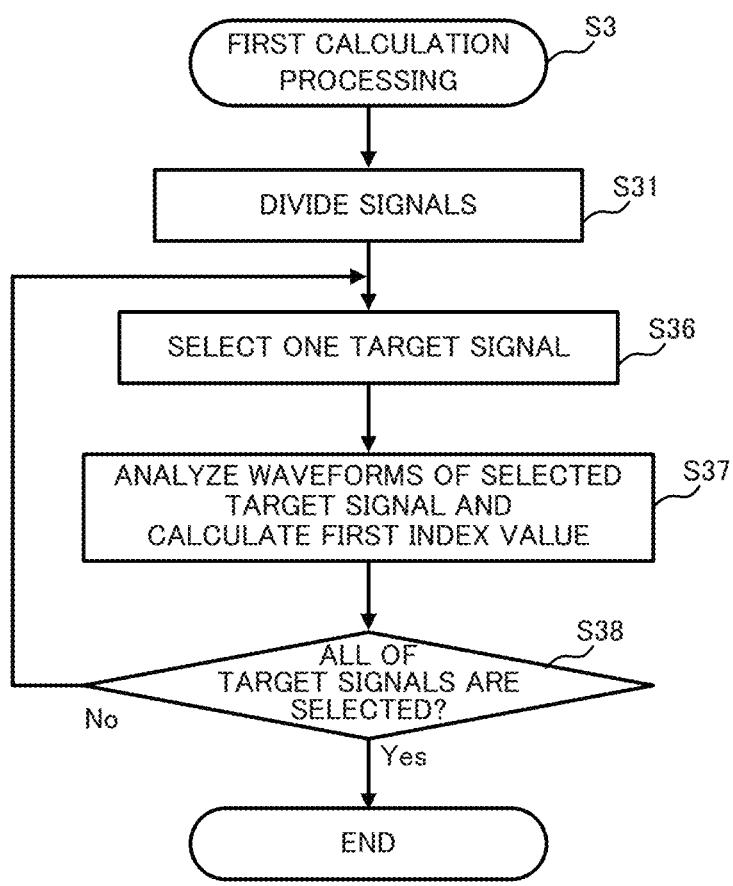
FIG. 17 is a flowchart of first calculation processing according to Embodiment 2.

As illustrated in FIG. 17, in the first calculation processing, the first calculator 110 divides a signal (step S31). The first calculator 110 selects one target signal that is not already selected (step S36), and analyzes waveforms of the selected target signal and calculates the similarity that serves as the first index value (step S37).

Then the first calculator 110 determines whether all target signals are selected (step S38). When a determination is made that all target signals are not selected (NO in step S38), the first calculator 110 repeats the processing in step S36 and beyond. Thus, when multiple target signals are input, the first index value is calculated for each of the target signals. When a determination is made that all target signals are selected (YES in step S38), the first calculation processing ends.

Figure 18:
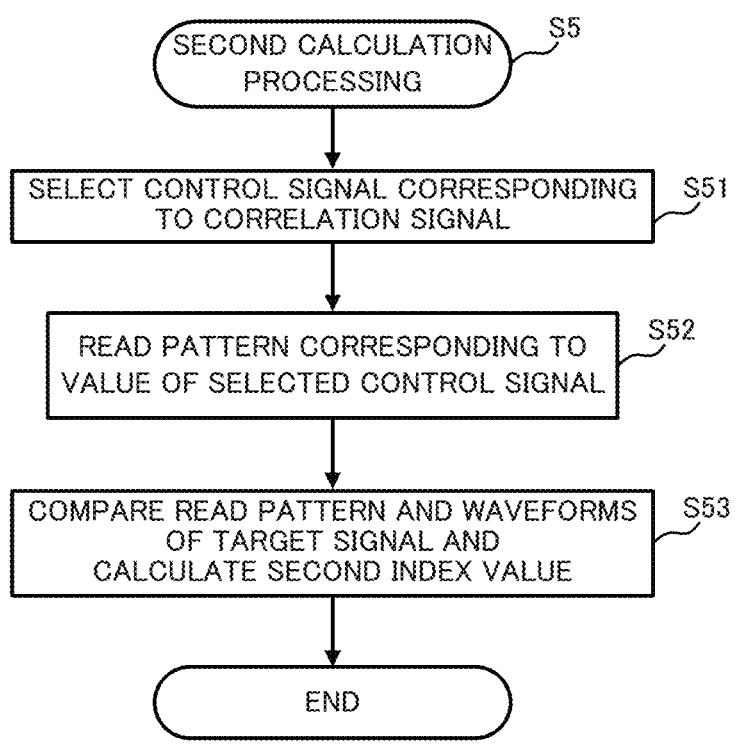
FIG. 18 is a flowchart of second calculation processing according to Embodiment 2.

As illustrated in FIG. 18, in the second calculation processing, the second calculator 120 selects a control signal corresponding to the correlation signal (step S51), and reads from the storage 121 a pattern corresponding to a value of the selected control signal (step S52). Then the second calculator 120 compares the read pattern and waveforms of the target signal and calculates the second index value (step S53). Thereafter, the second calculation processing ends.

As described above, the learner 122 learns, from the waveforms of the target learning signal, reference patterns corresponding to values of a control learning signal. Further, the second index value is calculated based on comparison between the target signal and a reference pattern included in the reference patterns and corresponding to a value of the control signal. This calculates the second index value using a more appropriate reference pattern, and thus is expected to accurately diagnose as to whether an abnormality occurs.

Furthermore, the correlation calculator 103 specifies, among multiple control learning signals, as the correlation signal, a control learning signal correlated to the target learning signal, and learning of the reference patterns is performed in accordance with values of the correlation signal. Performing learning of reference patterns in accordance with the values of the control learning signal correlated to the target learning signal leads to learning of reference patterns that appropriately indicate the waveforms of the target learning signal. Accurate diagnosis as to whether an abnormality occurs is expected due to such configuration.

Furthermore, the correlation calculator 103 specifies, among multiple control learning signals, as the correlation signal, a control learning signal correlated to feature amounts of the target learning signal. Calculating degrees of correlation after extracting feature amounts of a target learning signal enables, when the target learning signal has complicated waveforms, specifying a more appropriate control learning signal.

Embodiment 3

Next, Embodiment 3 is described with focus on differences from Embodiment 1 described above. In the present embodiment, components that are the same or equivalent to those of the above-described embodiment are denoted with the same reference signs, and explanation for such components is omitted or simplified. In Embodiment 1 described above, the second index value is calculated by simple comparison of multiple input signals with a multidimensional pattern. However, the second index value may be calculated using a method different from such simple comparison.

A diagnostic device 10 according to the present embodiment acquires, in addition to multiple target signals that serve as the input signals, learning signals that each correspond to a target signal of the multiple target signals. Then the diagnostic device 10 executes (i) learning processing for calculating a degree of correlation from the learning signals and (ii) diagnosis execution processing for diagnosing, based on the input signals, whether an abnormality occurs.

Figure 19:
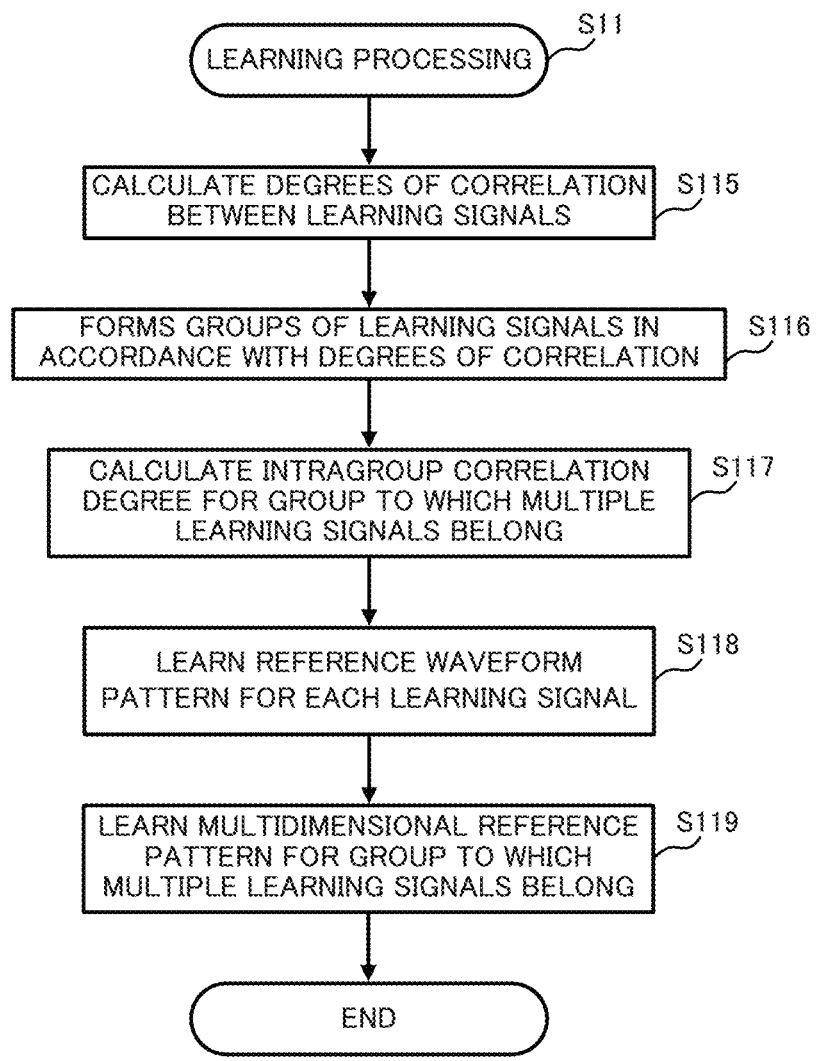
FIG. 19 is a flowchart of learning processing according to Embodiment 3.

As illustrated in FIG. 19, in the learning processing, the diagnostic device 10 calculates degrees of correlation between the learning signals (step S115). Specifically, the correlation calculator 103 calculates a correlation matrix between the learning signals.

Then the diagnostic device 10 forms groups of the learning signals in accordance with the degrees of correlation (step S116). Specifically, the correlation calculator 103 performs clustering of highly correlated learning signals, thereby forming multiple groups. The correlation calculator 103 forms multiple groups by, for example, repeating the process below: selecting one of the learning signals, specifying another learning signal with a correlation coefficient to the one learning signal that is equal to or higher than a predetermined threshold value, and clustering together the one learning signal and the other learning signal into one group.

Figure 20:
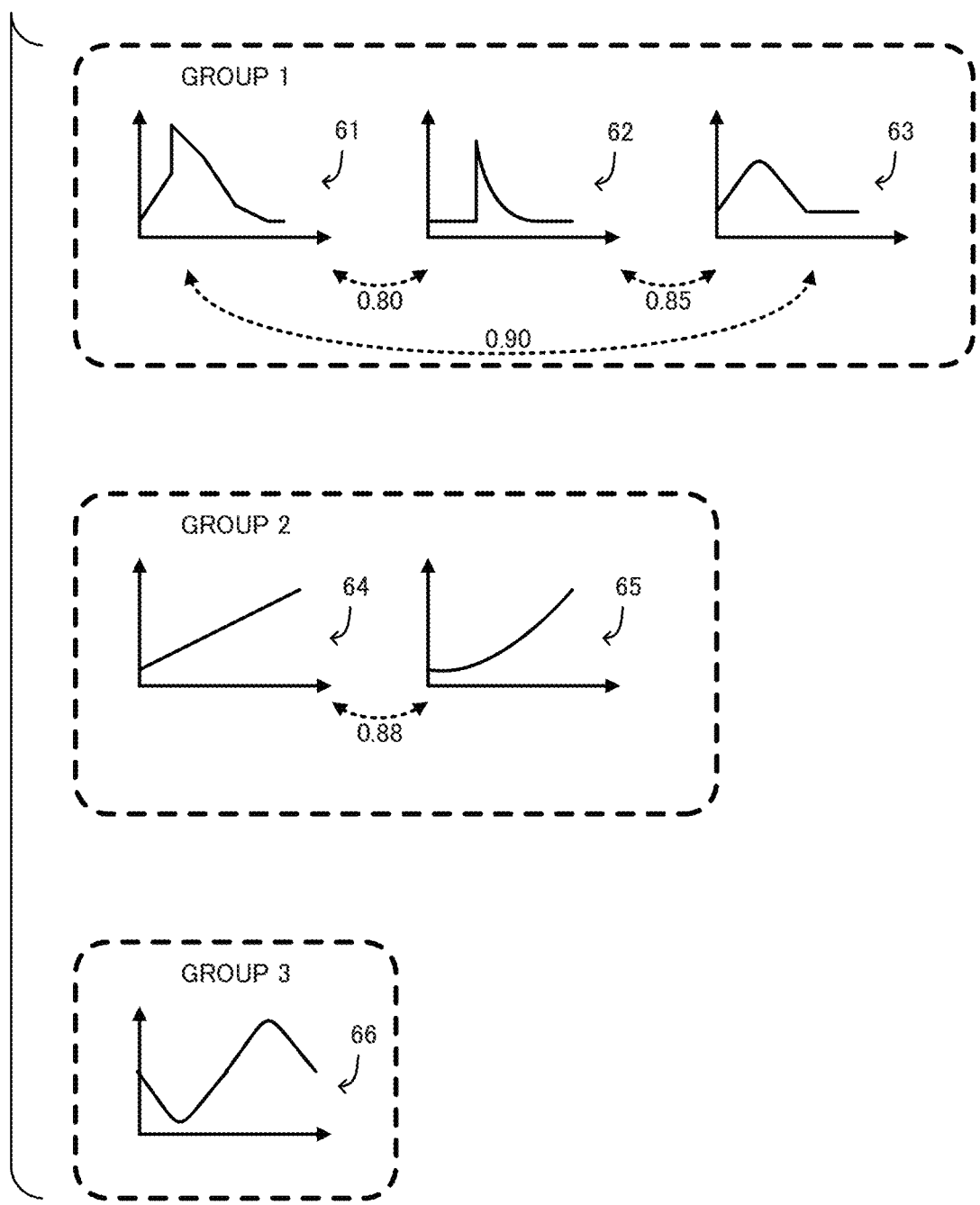
FIG. 20 illustrates an example of forming groups according to Embodiment 3.

FIG. 20 illustrates an example of forming groups for learning signals 61-66. In the example of FIG. 20, a group 1 into which the learning signals 61, 62, and 63 are clustered, a group 2 into which the learning signals 64 and 65 are clustered, and a group 3 into which the learning signal 66 is clustered are formed. Further, in FIG. 20, correlation coefficients between the learning signals are illustrated with broken arrows. For example, the correlation coefficient between the learning signals 61 and 62 is 0.80.

Again with reference to FIG. 19, the diagnostic device 10 calculates, for a group to which multiple learning signals belong, an intragroup correlation degree (step S117). Specifically, the correlation calculator 103 calculates, as the intragroup correlation degree for each group, a mean value of the correlation coefficients between the learning signals that belong to the corresponding group. In the example of FIG. 20, the intragroup correlation degree for the group 1 is calculated as 0.85, and the intragroup correlation degree for the group 2 is calculated as 0.88.

Then the diagnostic device 10 learns one or more reference patterns for each learning signal (step S118), and learns a multidimensional reference pattern for a group to which the multiple learning signals belong (step S119). Thereafter, the learning processing ends.

Following the learning processing, the diagnostic device 10 executes the diagnostic processing with a process similar to the flow illustrated in FIG. 9. Here, a second calculation processing included in the diagnosis processing is described in detail with reference to FIG. 21.

In the second calculation processing, the second calculator 120 forms groups of the input signals (step S501). Specifically, the second calculator 120 forms groups in accordance with the grouping determined in the learning processing. Thus, each of the input signals is to belong to a group that corresponds to the corresponding group that is generated in the learning processing and to which a learning signal corresponding to the input signal belongs. For example, by such configuration, an input signal corresponding to the learning signal 61 is clustered into the group 1, and an input signal corresponding to the learning signal 64 is clustered into the group 2.

Then the second calculator 120 performs individual analysis for a group consisting of single input signal (step S502). This individual analysis is performed using a method similar to that performed by the first calculator for the first index values. Thus, an index value indicating a degree of similarity of the input signal to reference waveform patterns is calculated for each group to which single input signal belongs.

Then the second calculator 120 performs individual analysis and collective analysis for groups including multiple input signals (step S503). This collective analysis is an analysis that is equivalent to that of Embodiment 1 that includes calculating the second index value based on comparison of multiple input signals with a multidimensional pattern. Thus, for each group to which multiple input signals belong, (i) index values that each indicate a degree of similarity of a corresponding input signal to a reference waveform pattern and (ii) an index value based on comparison of the multiple input signals that belong to the group with a multidimensional pattern are calculated.

Then the second calculator 120 calculates weighted sums of analysis results obtained in step S503, in accordance with the intragroup correlation degrees (step S504). Specifically, the second calculator 120, for each group to which multiple input signals belong, combines a result of the individual analysis and a result of the lumping analysis, using the weighting coefficients illustrated in FIG. 8.

Then the second calculator 120 combines analysis results of all groups (step S505). Specifically, the second calculator 120 calculates, as the second index value, a sum of the index value calculated in step S502 and the index value obtained as a result of the combination in step S504.

As described above, the diagnostic device 10 performs grouping of the learning signals and grouping of the input signals, and for a group including multiple signals, an index value is calculated based on comparison with a multidimensional pattern. Calculating an index value for each group is expected to enable more accurate diagnosis of an abnormality.

Although embodiments of the present disclosure are described above, the present disclosure is not limited with the above-described embodiments.

For example, although an example in which the diagnostic system 100 is a part of a production system is described, such description is not limiting. The diagnostic system 100 may be a part of a processing system such as a processing system and an inspection system, or may be an independent system that is not included in another system.

Furthermore, although an example in which the acquirer 101 of the diagnostic device 10 acquires the input signals via the network 20 is described, such description is not limiting. The acquirer 101 may, for example, reads the input signals from data that the user stores in the auxiliary storage 13.

Furthermore, although the aggregator 102 and the third calculator 130 that are included in the diagnostic device 10 are described as separate components, the aggregator 102 may be included in the third calculator 130. Specifically, the third calculator 130 may perform the operation performed by the aggregator 102. For example, the third calculator 130 may calculate the output value A3 by performing an operation expressed by the formula (2) below.

$$A3 = w1(\Sigma B1)/N + w2 \cdot A2 \qquad (2)$$

Here, B1 corresponds to the first index values that each are calculated for a corresponding target signal, N is a number of the target signals, w1 is a weighting coefficient of the first index values, A2 corresponds to the second index value, and w2 is a weighting coefficient of the second index value. The weighting coefficients w1 and w2 are determined in the same manner as in Embodiment 1 described above.

Furthermore, although the diagnostic device 10 acquires one target signal and one target learning signal in Embodiment 2 described above, such description is not limiting. For example, the diagnostic device 10 may acquire (i) input signals including multiple target signals and multiple control signals and (ii) learning signals including multiple target learning signals and multiple control learning signals. Further, the diagnostic device 10 may learn a multidimensional pattern from the multiple target learning signals based on values of a correlation signal, and then calculate the second index value based on comparison of the multiple target signals with the multidimensional pattern.

Furthermore, although the aforementioned embodiments describe calculating the output value by combining the first index value and the second index value, the number of index values that are combined to calculate the output value is not limited two and may be three or more. For example, the output value may be calculated by combining the first index value, the second index value, and a third index value different from the first index value and the second index value.

Furthermore, although in the aforementioned embodiments each of the first index value, the second index value, and the output value is a value that decreases as a degree of abnormality increases, this is not limiting, and may be a value that increases as the degree of abnormality increases. That is to say, whether an abnormality occurs may be diagnosed based on, instead of similarity, a degree of deviation that indicates a degree of deviation in waveforms. The degree of deviation is, for example, a value that ranges from zero to 1 and becomes zero in the case of matching of the waveforms. The degree of deviation is calculated by, for example, using the calculation formula "K=1−J" ("K" corresponds to the degree of deviation and "J" corresponds to the similarity). In employing such configuration, the diagnoser 140, when the degree of deviation is larger than a threshold value, diagnoses that an abnormality occurs.

Furthermore, the functions of the diagnostic device 10 can be achieved by dedicated hardware or by a normal computer system.

For example, distributing the program P1 to be executed by the processor 11 by storing the program P1 in a non-transitory computer-readable recording medium and then installing the program P1 on a computer can achieve an apparatus for executing the above-described processing. A flexible disk, a compact disc read-only memory (CD-ROM), a digital versatile disc (DVD), and a magneto-optical (MO) disc are conceivable as examples of such a recording medium.

Furthermore, the program P1 may be stored in a disk device included in a server device on a communication network such as the Internet and may be downloaded onto a computer, for example, by superimposing the program P1 on a carrier wave.

Furthermore, the above-described processing can also be achieved by starting and executing the program P1 while transferring the program P1 through the communication network.

Furthermore, the above-described processing can also be achieved by executing all or a portion of the program P1 on the server device and by executing, using the computer, the program while transmitting and receiving information relating to the processing via the communication network.

In the case where the above-described functions are implemented by an operating system (OS) by allotment to the OS or are implemented by cooperation between the OS and an application, for example, storage and distribution on the medium of only portions of the program P1 other than a portion of the program P1 executed by the OS is permissible. Alternatively, such portions of the program P1 may be downloaded to a computer.

Furthermore, the means for achieving the functions of the diagnostic device 10 is not limited to software, and a part of or all of the functions may be achieved by dedicated hardware including a circuit.

The foregoing describes some example embodiments for explanatory purposes. Although the foregoing discussion has presented specific embodiments, persons skilled in the art will recognize that changes may be made in form and detail without departing from the broader spirit and scope of the invention. Accordingly, the specification and drawings are to be regarded in an illustrative rather than a restrictive sense. This detailed description, therefore, is not to be taken in a limiting sense, and the scope of the invention is defined only by the included claims, along with the full range of equivalents to which such claims are entitled.

INDUSTRIAL APPLICABILITY

The present disclosure is suitable for diagnosing an abnormality indicated by a signal.

REFERENCE SIGNS LIST

100 Diagnostic system
10 Diagnostic device
11 Processor
12 Main storage
13 Auxiliary storage
14 Inputter
15 Outputter
16 Communicator
17 Internal bus
101 Acquirer
102 Aggregator
103 Correlation calculator
110 First calculator
111 Divider
112 Individual analyzer
113 Storage
120 Second calculator
121 Storage
122 Learner
123 Collective analyzer
130 Third calculator
140 Diagnoser
1021, 1022, 1222, 1223, 1232 Module
1023, 1221, 1231 Selector
20 Network
21 Device
211 Signal source
23, 24 Waveform
26 Window
27 Memory
31, 32, 41 Target signal
40 Input signal
42 Control signal
50 Learning signal
51 Target learning signal
52 Control learning signal
61-66 Learning signal
L1, L2 Line
P1 Program

The invention claimed is:

1. A diagnostic device comprising:
an acquirer to acquire a plurality of input signals including a target signal to be diagnosed for abnormality; and
a diagnoser to diagnose, based on a weighted sum of a first index value relating to the target signal and a second index value relating to the plurality of input signals, whether an abnormality occurs, the weighted sum being calculated using weights corresponding to a correlation between the plurality of input signals, wherein
the first index value indicates (i) a degree of similarity of a waveform of the target signal to a predetermined reference waveform or (ii) a degree of deviation of the waveform of the target signal from the predetermined reference waveform,
the second index value is a value that is based on comparison between the target signal and a predetermined pattern and is calculated using values of the plurality of input signals, and a weighting coefficient of the first index value that is used to calculate the weighted sum when a degree of correlation between the plurality of input signals is high is smaller than a weighting coefficient that is used to calculate the weighted sum when the degree of correlation between the plurality of input signals is low.

2. The diagnostic device according to claim 1, wherein the acquirer acquires a plurality of the target signals as the plurality of input signals, the diagnoser diagnoses whether an abnormality occurs using a plurality of the first index values and the second index value, each of the plurality of first index values relating to a corresponding target signal, each of the plurality of first index values indicates a degree of similarity of a waveform of the corresponding target signal to the reference waveform that is predetermined to correspond to the corresponding target signal, and the second index value indicates a degree of similarity of the plurality of target signals to the pattern, the pattern being multidimensional.

3. The diagnostic device according to claim 2, wherein the diagnoser diagnoses whether an abnormality occurs based on a weighted sum of the plurality of first index values and the second index value, the weighted sum being calculated using weights corresponding to a correlation between the plurality of target signals.

4. The diagnostic device according to claim 1, further comprising:

a learner to learn the pattern from a learning signal, wherein the acquirer (i) acquires, as a plurality of the learning signals, a target learning signal corresponding to the target signal and a control learning signal corresponding to a control signal for controlling a device and (ii) acquires the plurality of input signals including the target signal and the control signal, the learner learns, from the target learning signal, a plurality of the patterns corresponding to values of the control learning signal, and the second index value is a value that is based on comparison between (i) the target signal and (ii) a pattern that is included in the plurality of patterns learned by the learner and corresponds to a value of the control signal.

5. The diagnostic device according to claim 4, further comprising:

a correlation calculator to calculate a degree of correlation of a signal to another signal, wherein the acquirer acquires a plurality of the control learning signals and a plurality of the control signals, the correlation calculator specifies, as a correlation signal, a control learning signal correlated to the target learning signal among the plurality of control learning signals, the learner learns, from the target learning signal, a plurality of the patterns corresponding to values of the correlation signal, and the second index value is a value that is based on comparison between (i) the target signal and (ii) a pattern that is included in the plurality of patterns and corresponds to a value of a control signal included in the plurality of control signals and corresponding to the correlation signal.

6. The diagnostic device according to claim 5, wherein the correlation calculator specifies, among the plurality of control learning signals, as the correlation signal, a control learning signal correlated to feature amounts of the target learning signal.

7. A diagnostic method comprising:

an acquisition step of acquiring a plurality of input signals including a target signal to be diagnosed for abnormality; and a diagnosis step of diagnosing, based on a weighted sum of a first index value and a second index value, whether an abnormality occurs, the weighted sum being calculated using weights corresponding to a correlation between the plurality of input signals, wherein the first index value indicates (i) a degree of similarity of a waveform of the target signal to a predetermined reference waveform or (ii) a degree of deviation of the waveform of the target signal from the predetermined reference waveform, the second index value is a value that is based on comparison between the target signal and a predetermined pattern and is calculated using values of the plurality of input signals, and a weighting coefficient of the first index value that is used to calculate the weighted sum when a degree of correlation between the plurality of input signals is high is smaller than a weighting coefficient that is used to calculate the weighted sum when the degree of correlation between the plurality of input signals is low.

8. A non-transitory recording medium storing a program causing a computer to implement:

acquiring a plurality of input signals including a target signal to be diagnosed for abnormality; and diagnosing, based on a weighted sum of a first index value and a second index value, whether an abnormality occurs, the weighted sum being calculated using weights corresponding to a correlation between the plurality of input signals, wherein the first index value indicates (i) a degree of similarity of a waveform of the target signal to a predetermined reference waveform or (ii) a degree of deviation of the waveform of the target signal from the predetermined reference waveform, the second index value is a value that is based on comparison between the target signal and a predetermined pattern and is calculated using values of the plurality of input signals, and a weighting coefficient of the first index value that is used to calculate the weighted sum when a degree of correlation between the plurality of input signals is high is smaller than a weighting coefficient that is used to calculate the weighted sum when the degree of correlation between the plurality of input signals is low.

* * * * *